United States Patent
Madier et al.

(10) Patent No.: US 12,294,397 B2
(45) Date of Patent: May 6, 2025

(54) CSI ASSISTED CRS-IM ADVANCED RECEIVERS

(71) Applicant: Nokia Technologies Oy, Espoo (FI)

(72) Inventors: Louis Madier, Les Ulis (FR); Karsten Petersen, Aalborg (DK); Axel Mueller, Paris (FR); Navin Hathiramani, Coppell, TX (US)

(73) Assignee: Nokia Technologies Oy, Espoo (FI)

( * ) Notice: Subject to any disclaimer, the term of this patent is extended or adjusted under 35 U.S.C. 154(b) by 373 days.

(21) Appl. No.: 17/847,376

(22) Filed: Jun. 23, 2022

(65) Prior Publication Data

US 2023/0421186 A1    Dec. 28, 2023

(51) Int. Cl.
  *H04B 1/10*    (2006.01)
  *H04B 17/318*  (2015.01)
  *H04B 17/345*  (2015.01)

(52) U.S. Cl.
  CPC ............. *H04B 1/10* (2013.01); *H04B 17/318* (2015.01); *H04B 17/345* (2015.01)

(58) Field of Classification Search
  CPC ....... H04B 1/10; H04B 17/318; H04B 17/345
  See application file for complete search history.

(56) References Cited

U.S. PATENT DOCUMENTS

| | | | | |
|---|---|---|---|---|
| 11,509,519 B2* | 11/2022 | Siomina | ............... | H04L 5/0048 |
| 2016/0204910 A1* | 7/2016 | Kim | .............. | H04B 7/024 |
| | | | | 370/252 |
| 2020/0252910 A1* | 8/2020 | Wu | ........... | H04W 72/02 |
| 2023/0136719 A1* | 5/2023 | Abedini | ............... | H04B 17/23 |
| | | | | 455/73 |
| 2023/0188231 A1* | 6/2023 | Chong | ............... | H04B 17/345 |
| | | | | 370/252 |
| 2023/0388871 A1* | 11/2023 | Guo | ............... | H04W 36/0069 |
| 2023/0413090 A1* | 12/2023 | Elshafie | ............... | H04W 24/10 |

FOREIGN PATENT DOCUMENTS

WO    WO-2023273055 A1 *    1/2023

OTHER PUBLICATIONS

R4-2207239, "WF on general part and 15 KHz NR SCS scenarilo for CRS-IM receiver", 3GPP TSG-RAN WG4 Meeting #102-e, Mar. 2022, 12 pages.
R4-2120705, "WF on CRS-IM receiver in scenarios with overlapping spectrum for LTE and NR", 3GPP TSG-WG RAN4 Meeting #101-e, Nov. 2021, 20 pages.

(Continued)

*Primary Examiner* — David Bilodeau
(74) *Attorney, Agent, or Firm* — McCarter & English, LLP

(57) ABSTRACT

A UE receives configuration for interference mitigation pattern(s) indicating which resource elements in a time-frequency resource space should be measured. The UE performs interference measurements based on the received one or more interference mitigation patterns. A network node determines configuration for interference mitigation pattern(s0 indicating which resource elements in a time-frequency resource space should be measured by a user equipment. The network node sends, toward the user equipment, the configuration for use by the user equipment to perform interference measurements of the one or more interference mitigation patterns.

20 Claims, 15 Drawing Sheets

(56) References Cited

OTHER PUBLICATIONS

R4-2207238, "LS on UE capability and network assistant signaling for CRS interference mitigation in scenarios with overlapping spectrum for LTE and NR", 3GPP TSGH-RAN WG4 Meeting #102-e, 3 pages.

3GPP TS 38,331 V17.0.0, "3rd Generation Partnership Project; Technical Specification Group Radio Access Network; NR; Radio Resource Control (RRC) protocol specification (Release 17)", Mar. 2022, 1221 pages.

3GPP TS 38.214 V17.2.0, "3rd Generation Partnership Project; Technical Specification Group Radio Access Network; NR; Physical layer procedures for data (Release 17)", Jun. 2022, 229 pages.

3GPP TS 36.211 V17.1.0, "3rd Generation Partnership Project; Technical Specification Group Radio Access Network; Evolved Universal Terrestrial Radio Access (E-UTRA); Physical channels and modulation (Release 17)", Mar. 2022, 10 pages.

\* cited by examiner

CSI ASSISTED CRS-IM ADVANCED RECEIVERS

TECHNICAL FIELD

Exemplary embodiments herein relate generally to wireless communications and, more specifically, relates to using patterns in certain slots of a frame for interference measurement, the results of which can be used in different slots.

BACKGROUND

In Long Term Evolution (LTE) (also called 4G, fourth generation) networks, a User Equipment (UE, a wireless device) uses the Cell Reference Signal (CRS) to estimate the channel quality. CRS was designed to be continuously broadcasted (e.g., "always on"), and this continuous transmission of CRS in LTE may result in unwanted downlink interference. In particular, as fifth generation (5G), also referred to as New Radio (NR), devices are being implemented, there is coexistence between LTE and NR devices.

Spectrum sharing is being used to enable this coexistence of NR and LTE as defined by 3GPP (third Generation Partnership Project) specifications. One way to implement spectrum sharing is static frequency-domain sharing, where a part of the spectrum allocated to LTE is migrated to NR. Another way to implement spectrum sharing is Dynamic Spectrum Sharing (DSS), adopted since Release 15 of the 3GPP specifications, where NR and LTE may dynamically share the same spectrum.

Coexistence of the LTE and NR networks may cause interference from NR to LTE and from LTE to NR. NR cells address neighboring LTE cell's "always on" CRS using the following.

1) CRS Rate Matching (CRS-RM), which was specified in Rel-15 and Rel-16.

For CRS-RM, the serving cell's scheduler uses a Rate Matching (RM) algorithm to puncture resource elements carrying LTE CRS of:

a) the cell itself when the cell additionally supports LTE traffic (in a DSS feature); and/or b) one or more neighboring cells.

Puncturing, as is known, is a technique where certain resource elements are not used for sending data to the configured UE. The punctured REs can be filled with other data or other reference signals or can be empty.

The network sends the required semi-static information/configuration to the UE as reserved resources, and the NR Physical Downlink Shared CHannel (PDSCH) is rate matched around those reserved resources.

2) CRS Interference Mitigation (CRS-IM), which is not specified yet for NR and is under discussion in RAN4 (a group within 3GPP that is responsible for radio performance and protocol aspects) to evaluate its performance.

In CRS-IM, the NR cell does not protect its UEs that are provided with advanced receivers from LTE CRS interfering signals. Instead, the interfering signal of LTE CRS cells can be mitigated using different types of (e.g., advanced) receivers for example:

a) Successive interference cancellation receivers;

b) LLR weighting receivers; or c) Other types of receivers.

While some mitigation may be performed using these techniques, this could still be improved.

BRIEF SUMMARY

This section is intended to include examples and is not intended to be limiting.

In an exemplary embodiment, a method is disclosed that includes receiving, at a user equipment, configuration for one or more interference mitigation patterns indicating which resource elements in a time-frequency resource space should be measured. The method includes performing interference measurements, by the user equipment, based on the received one or more interference mitigation patterns.

An additional exemplary embodiment includes a computer program, comprising code for performing the method of the previous paragraph, when the computer program is run on a processor. The computer program according to this paragraph, wherein the computer program is a computer program product comprising a computer-readable medium bearing computer program code embodied therein for use with a computer. Another example is the computer program according to this paragraph, wherein the program is directly loadable into an internal memory of the computer.

An exemplary apparatus includes one or more processors and one or more memories including computer program code. The one or more memories and the computer program code are configured to, with the one or more processors, cause the apparatus at least to: receive, at a user equipment, configuration for one or more interference mitigation patterns indicating which resource elements in a time-frequency resource space should be measured; and perform interference measurements, by the user equipment, based on the received one or more interference mitigation patterns.

An exemplary computer program product includes a computer-readable storage medium bearing computer program code embodied therein for use with a computer. The computer program code includes: code for receiving, at a user equipment, configuration for one or more interference mitigation patterns indicating which resource elements in a time-frequency resource space should be measured; and code for performing interference measurements, by the user equipment, based on the received one or more interference mitigation patterns.

In another exemplary embodiment, an apparatus comprises means for performing: receiving, at a user equipment, configuration for one or more interference mitigation patterns indicating which resource elements in a time-frequency resource space should be measured; and performing interference measurements, by the user equipment, based on the received one or more interference mitigation patterns.

In an exemplary embodiment, a method is disclosed that includes determining, by a network node, configuration for one or more interference mitigation patterns indicating which resource elements in a time-frequency resource space should be measured by a user equipment. The method also includes sending, from the network node toward the user equipment, the configuration for use by the user equipment to perform interference measurements of the one or more interference mitigation patterns.

An additional exemplary embodiment includes a computer program, comprising code for performing the method of the previous paragraph, when the computer program is run on a processor. The computer program according to this paragraph, wherein the computer program is a computer program product comprising a computer-readable medium bearing computer program code embodied therein for use with a computer. Another example is the computer program according to this paragraph, wherein the program is directly loadable into an internal memory of the computer.

An exemplary apparatus includes one or more processors and one or more memories including computer program code. The one or more memories and the computer program code are configured to, with the one or more processors, cause the apparatus at least to: determine, by a network node, configuration for one or more interference mitigation patterns indicating which resource elements in a time-frequency resource space should be measured by a user equipment; and send, from the network node toward the user equipment, the configuration for use by the user equipment to perform interference measurements of the one or more interference mitigation patterns.

An exemplary computer program product includes a computer-readable storage medium bearing computer program code embodied therein for use with a computer. The computer program code includes: code for determining, by a network node, configuration for one or more interference mitigation patterns indicating which resource elements in a time-frequency resource space should be measured by a user equipment; and code for sending, from the network node toward the user equipment, the configuration for use by the user equipment to perform interference measurements of the one or more interference mitigation patterns.

In another exemplary embodiment, an apparatus comprises means for performing: determining, by a network node, configuration for one or more interference mitigation patterns indicating which resource elements in a time-frequency resource space should be measured by a user equipment; and sending, from the network node toward the user equipment, the configuration for use by the user equipment to perform interference measurements of the one or more interference mitigation patterns.

DETAILED DESCRIPTION OF THE DRAWINGS

Figure 1:
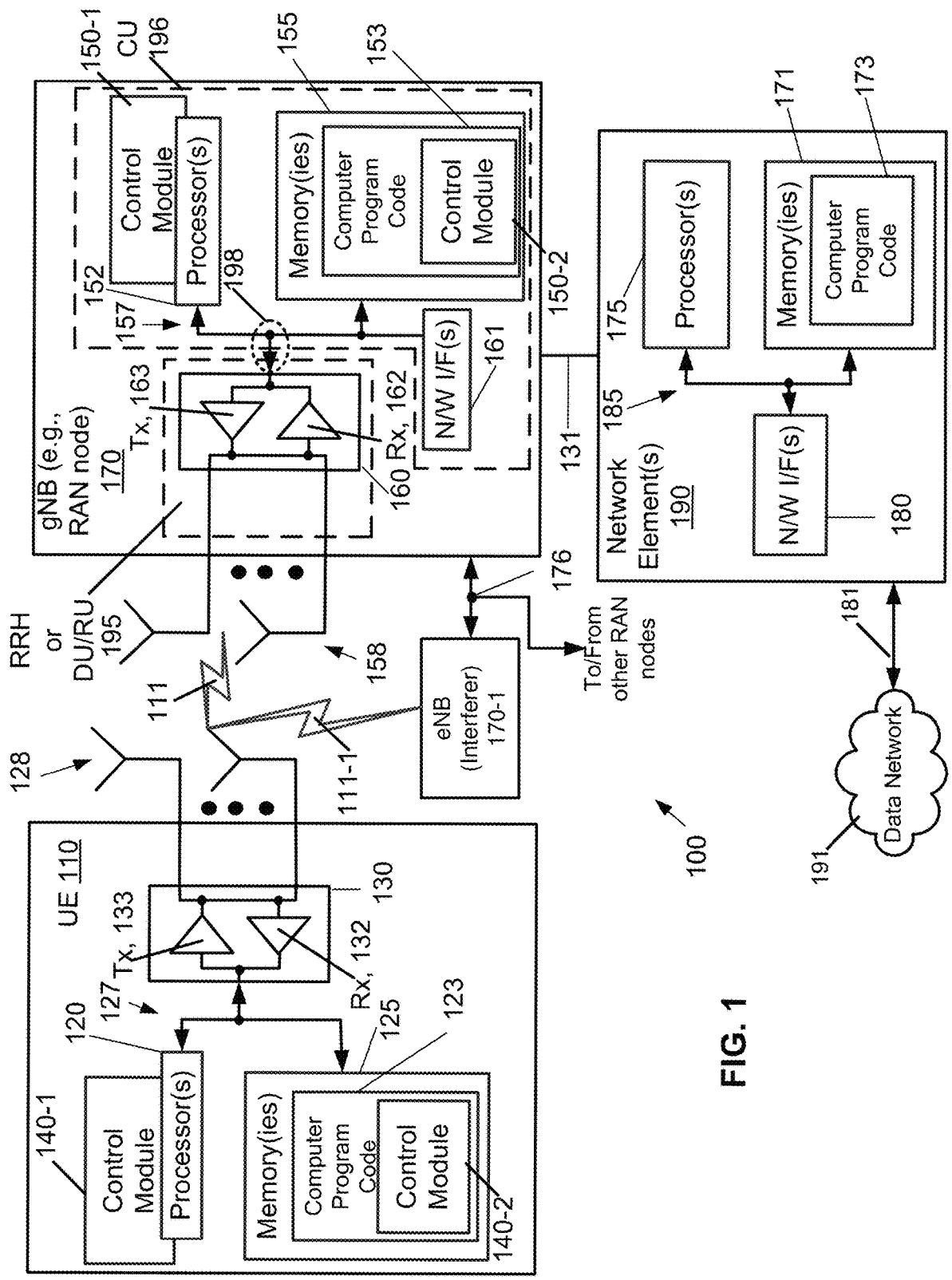
FIG. 1 is a block diagram of one possible and non-limiting exemplary system in which the exemplary embodiments may be practiced.

Abbreviations that may be found in the specification and/or the drawing figures are defined below, at the end of the detailed description section.

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

When more than one drawing reference numeral, word, or acronym is used within this description with "/", and in general as used within this description, the "/" may be interpreted as "or", "and", or "both".

As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

The exemplary embodiments herein describe techniques for CSI assisted CRS-IM advanced receivers. Additional description of these techniques is presented after a system into which the exemplary embodiments may be used is described.

Turning to FIG. 1, this figure shows a block diagram of one possible and non-limiting exemplary system in which the exemplary embodiments may be practiced. A user equipment (UE) 110, a gNB (e.g., a radio access network (RAN) node) 170, an eNB 170-1, and network element(s) 190 are illustrated. In FIG. 1, a user equipment (UE) 110 is in wireless communication with a wireless network 100.

A UE is a wireless, typically mobile device that can access a wireless network. The UE 110 includes circuitry comprising one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123.

The UE 110 includes a control module 140, comprising one of or both parts 140-1 and/or 140-2, which may be implemented in a number of ways. The control module 140 may be implemented in hardware as control module 140-1, such as being implemented as part of the one or more processors 120. The control module 140-1 may be implemented also as an integrated circuit or through other hardware such as a programmable gate array. In another example, the control module 140 may be implemented as control module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein.

The gNB (e.g., RAN node) 170 is a base station (BS) that provides access by wireless devices such as the UE 110 to the wireless network 100. The RAN node 170 may be, for instance, a base station for 5G, also called New Radio (NR), and is commonly referred to as a gNB. The gNB 170 is assumed herein, although this is only one possibility, as described below. The UE 110 communicates with the eNB 170 via radio link 111. There is also an eNB 170-1, which is considered to be in interferer, and the UE 110 communicates with (or at least receives interference from) the eNB 170-1 via radio link 111-1. The eNB 170-1 is, in this example, an LTE base station. The eNB 170-1 can create interference to a UE operating with the gNB 170, as described in more detail below. For ease of description both base stations 170 and 170-1 are assumed to contain the circuitry as described in gNB 170, although the eNB 170-1 might not contain the NR circuitry. For instance, the gNB 170 may contain the distributed unit (DU)/radio unit (RU) 195, but the eNB 170-1 would instead contain the remote radio head (RRH) 195.

In 5G, the gNB 170 may be a NG-RAN node, which is defined as either a gNB or an ng-eNB. A gNB is a node providing NR user plane and control plane protocol terminations towards the UE, and connected via the NG interface to a 5GC (e.g., the network element(s) 190). The ng-eNB is a node providing E-UTRA user plane and control plane protocol terminations towards the UE, and connected via the NG interface to the 5GC. The NG-RAN may include multiple gNBs, which may also include a central unit (CU) (gNB-CU) 196 and distributed unit(s) (DUs) (gNB-DUs), of which DU 195 is shown. Note that the DU may include or be coupled to and control a radio unit (RU). The gNB-CU is a logical node hosting RRC, SDAP and PDCP protocols of the gNB or RRC and PDCP protocols of the en-gNB that controls the operation of one or more gNB-DUs. The gNB-CU terminates the F1 interface connected with the gNB-DU. The F1 interface is illustrated as reference 198, although reference 198 also illustrates a link between remote elements of the RAN node 170 and centralized elements of the RAN node 170, such as between the gNB-CU 196 and the gNB-DU 195. The gNB-DU is a logical node hosting RLC, MAC and PHY layers of the gNB or en-gNB, and its operation is partly controlled by gNB-CU. One gNB-DU supports one or multiple cells. One cell is supported by one gNB-DU. The gNB-DU terminates the F1 interface 198 connected with the gNB-CU. Note that the DU 195 is considered to include the transceiver 160, e.g., as part of an RU, but some examples of this may have the transceiver 160 as part of a separate RU, e.g., under control of and connected to the DU 195. The RAN node 170 may also be an eNB (evolved NodeB) base station, for LTE (long term evolution), or any other suitable base station.

The RAN node 170 includes circuitry comprising one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The CU 196 may include the processor(s) 152, memories 155, and network interfaces 161. Note that the DU 195 may also contain its own memory/memories and processor(s), and/or other hardware, but these are not shown.

The RAN node 170 includes a control module 150, comprising one of or both parts 150-1 and/or 150-2, which may be implemented in a number of ways. The control module 150 may be implemented in hardware as control module 150-1, such as being implemented as part of the one or more processors 152. The control module 150-1 may be implemented also as an integrated circuit or through other hardware such as a programmable gate array. In another example, the control module 150 may be implemented as control module 150-2, which is implemented as computer program code 153 and is executed by the one or more processors 152. For instance, the one or more memories 155 and the computer program code 153 are configured to, with the one or more processors 152, cause the RAN node 170 to perform one or more of the operations as described herein. Note that the functionality of the control module 150 may be distributed, such as being distributed between the DU 195 and the CU 196, or be implemented solely in the DU 195.

The one or more network interfaces 161 communicate over a network such as via the links 176 and 131. Two or more RAN nodes 170 communicate using, e.g., link 176. The link 176 may be wired or wireless or both and may implement, e.g., an Xn interface for 5G, an X2 interface for LTE, or other suitable interface for other standards.

It is noted that the gNB 170 and the eNB 170-1 are connected via link 176 in this example. This is, however, only exemplary, and the eNB 170-1 may be from a network different from network 100 and therefore not connected to the gNB 170.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195 for LTE or a distributed unit (DU) 195 for gNB implementation for 5G, with the other elements of the RAN node 170 possibly being physically in a different location from the RRH/DU, and the one or more buses 157 could be implemented in part as, e.g., fiber optic cable or other suitable network connection to connect the other elements (e.g., a central unit (CU), gNB-CU) of the RAN node 170 to the RRH/DU 195. Reference 198 also indicates those suitable network link(s).

It is noted that description herein indicates that "cells" perform functions, but it should be clear that the base station that forms the cell will perform the functions. The cell makes up part of a base station. That is, there can be multiple cells per base station. For instance, there could be three cells for a single carrier frequency and associated bandwidth, each cell covering one-third of a 360-degree area so that the single base station's coverage area covers an approximate oval or circle. Furthermore, each cell can correspond to a single carrier and a base station may use multiple carriers. So, if there are three 120-degree cells per carrier and two carriers, then the base station has a total of 6 cells.

The wireless network 100 may include a network element or elements 190 that may include core network functionality, and which provides connectivity via a link or links 181 with a data network 191, such as a telephone network and/or a data communications network (e.g., the Internet). Such core network functionality for 5G may include access and mobility management function(s) (AMF(s)) and/or user plane functions (UPF(s)) and/or session management function(s) (SMF(s)). Such core network functionality for LTE may include MME (Mobility Management Entity) functionality and/or SGW (Serving Gateway) functionality. These are merely exemplary functions that may be supported by the network element(s) 190, and note that both 5G and LTE functions might be supported. The RAN node 170 is coupled via a link 131 to a network element 190. The link 131 may be implemented as, e.g., an NG interface for 5G, or an S1 interface for LTE, or other suitable interface for other standards. The network element 190 includes circuitry comprising one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the network element 190 to perform one or more operations.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor-based memory devices, flash memory, firmware, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general-purpose computers, special purpose computers, microprocessors, digital signal processors (DSPs) and processors based on a multi-core processor architecture, as non-limiting examples. The processors 120, 152, and 175 may be means for performing functions, such as controlling the UE 110, RAN node 170, and other functions as described herein.

In general, the various embodiments of the user equipment 110 can include, but are not limited to, cellular telephones (such as smart phones, mobile phones, cellular phones, voice over Internet Protocol (IP) (VoIP) phones, and/or wireless local loop phones), tablets, portable computers, vehicles or vehicle-mounted devices for, e.g., wireless V2X (vehicle-to-everything) communication, image capture devices such as digital cameras, gaming devices, music storage and playback appliances, Internet appliances (including Internet of Things, IoT, devices), IoT devices with sensors and/or actuators for, e.g., automation applications, as well as portable units or terminals that incorporate combinations of such functions, laptop-embedded equipment (LEE), laptop-mounted equipment (LME), Universal Serial Bus (USB) dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. That is, the UE 110 could be any end device that may be capable of wireless communication. By way of example rather than limitation, the UE may also be referred to as a communication device, terminal device (MT), a Subscriber Station (SS), a Portable Subscriber Station, a Mobile Station (MS), or an Access Terminal (AT).

Having thus introduced one suitable but non-limiting technical context for the practice of the exemplary embodiments, the exemplary embodiments will now be described with greater specificity.

An introduction to the technical area is now presented. RAN4 had a discussion on CRS-IM, and the outcome included the following. In the latest RAN4 meetings (RAN4 #101-bis and RAN4 #102e), it has been decided that there are two ways beside blind detection, with which the UE can obtain information about the interference cells:

1) Network Assistance (NWA) which is an optional IE containing a number of RAN4 proposed fields (all optional).

2) InterRAT MO which needs to be scheduled by the NW. As is known, a MO is a configuration of time frequency resources, where the NR UE is supposed to carry out measurements to figure out the presence and strength of another radio access technology (RAT), e.g., LTE.

It is assumed that UEs, which do not support InterRAT MO or do not receive the required fields in the NWA IE, will either not enable CRS-IM or will blind-detect the missing parameters required to enable CRS-IM.

For a NR UE that is CRS-IM capable with traffic/signals that is/are sensitive to delay, e.g., due to the UE being mobile, one question is whether is it possible to find a more immediate way to detect the dominant LTE interferer, as well as its parameters (if not signaled by the network), without performing Inter-RAT measurements.

For this technical area, CSI resources are an additional element that needs to be addressed. For ease of reference, these are introduced herein as CSI-RS and CSI-IM.

With respect to CSI-RS, a CSI-RS is configured for a given downlink bandwidth part and uses the numerology of the bandwidth part. The CSI-RS can be configured to cover the full bandwidth of the bandwidth part or just a fraction. CSI-RS can be configured for periodic, semi-persistent, or aperiodic transmission. A configured CSI-RS can be used to derive information about the properties of the channel over which the CSI-RS transmitted. A CSI-RS can also be used to estimate the interference level by subtracting the expected received signal from what is actually received on the CSI-RS resource.

To clarify terminology used herein, there are several distinct terms in this area: CSI-IM (channel state information, CSI, interference measurement), CSI-RS (CSI-reference signal); CRS-IM (cell reference signal, CRS, interference mitigation); and CRS-RM (CRS-rate matching). An introduction is provided for the applicable terms.

CSI-RS designates a set REs in the resource grid (also referred to herein as a time-frequency resource space). There can be NZP (non zero power) CSI-RS, which indicate the transmission of an RS in the designated REs. There can be ZP (zero power) CSI-RS, which indicate the designated REs are to be "empty". Meanwhile, CSI-IM uses ZP-CSI-RS to designate REs where the UE can carry out interference measurements. Note that this is not only LTE interference, but more often other NR cell interference.

More specifically, CRS-IM is an umbrella term used to designate techniques that aim at interference mitigation coming from the CRS (cell reference signal) of LTE cells. The most common techniques include the following:

1) IC (interference cancellation), where the UE tries to recreate the interference signal and thus removes the interference signal from the receive signal.

2) LLR weighting, where the UE derives how much interference power is present in which REs and the UE then reduces the "weight" of signals received in those REs.

There is also CRS-RM (rate matching), which tells the UE that no useful signals are sent in REs where CRS interference is present. There are two types of CSI-RS that could be configured to a given UE:

1) NZP CSI-RS: where the UE assumes to receive the reference signal on the CSI-RS defined resources.

2) ZP CSI-RS: where the UE should not assume any type of transmission on these resources from the BS unless the UE is told otherwise (e.g., configured with extra CSI-IM resources).

Regarding Interference Measurement Resources (CSI-IM), a CSI-IM resource can be configured for the purposes of interference measurement to enable accurate CSI reporting reflecting inter-cell interference. A restricted number of patterns is supported. In fact, there are currently only two different CSI-IM patterns, each consisting of four resource elements but with different time/frequency structures, and these have the same flexibility in where within a slot they may be configured.

The time-domain property of a CSI-IM resource is the same as that of CSI-RS. CSI-IM resource could be periodic, semi-persistent (activation/deactivation by means of MAC-CE), or aperiodic (triggered by DCI).

In a typical case, a CSI-IM resource would correspond to resource elements where nothing is transmitted within the current cell, while the activity within the CSI-IM resource in neighbor cells should correspond to normal activity of those cells. That is, CSI-IM resources are ZP-CSI-RS; i.e., they are left empty by the NR cell. However, the LTE cell does not have such a function, hence the LTE interference (e.g., CRS and data/DM-RS) will still be present in the CSI-IM REs. Thus, by measuring the receiver power within a CSI-IM resource, a device would get an estimate on the typical interference due to transmissions within other cells. As there should be no transmissions on CSI-IM resources within the cell, devices should be configured with the corresponding resources as ZP-CSI-RS resources.

A CSI-IM-Resource information element in 3GPP TS 38.331 is defined as follows:

```
CSI-IM-Resource ::= SEQUENCE {
csi-IM-ResourceId CSI-IM-ResourceId,
csi-IM-ResourceElementPattern CHOICE {
pattern0 SEQUENCE {
subcarrierLocation-p0 ENUMERATED { s0, s2, s4, s6, s8, s10 },
symbolLocation-p0 INTEGER (0..12)
},
pattern1 SEQUENCE {
subcarrierLocation-p1 ENUMERATED { s0, s4, s8 },
symbolLocation-p1 INTEGER (0..13)
}
} OPTIONAL, -- Need M
freqBand CSI-FrequencyOccupation OPTIONAL, -- Need M
periodicityAndOffset CSI-ResourcePeriodicityAndOffset OPTIONAL, --
Cond PeriodicOrSemiPersistent
...
}
```

And the fields are described as follows:
CSI-IM-Resource Field Descriptions
csi-IM-ResourceElementPattern
 The resource element pattern (Pattern0 (2,2) or Pattern1 (4,1)) with corresponding parameters (see TS 38.214[19], clause 5.2.2.4)
freqBand
 Frequency-occupancy of CSI-IM (see TS 38.214[19], clause 5.2.2.4)
periodicityAndOffset
 Periodicity and slot offset for periodic/semi-persistent CSI-IM. Network always configures the UE with a value for this field for periodic and semi-persistent CSI-IM-Resources (as indicated in CSI-ResourceConfig). A change of configuration between periodic or semi-persistent and aperiodic for a CSI-IM-Resource is not supported without a release and add.
subcarrierLocation-p0
 OFDM subcarrier occupancy of the CSI-IM resource for Pattern0 (see TS 38.214[19], clause 5.2.2.4)
subcarrierLocation-p1
 OFDM subcarrier occupancy of the CSI-IM resource for Pattern1 (see TS 38.214[19], clause 5.2.2.4)
symbolLocation-p0
 OFDM symbol location of the CSI-IM resource for Pattern0 (see TS 38.214[19], clause 5.2.2.4)
symbolLocation-p1
 OFDM symbol location of the CSI-IM resource for Pattern1 (see TS 38.214[19], clause 5.2.2.4)

Figure 1A:
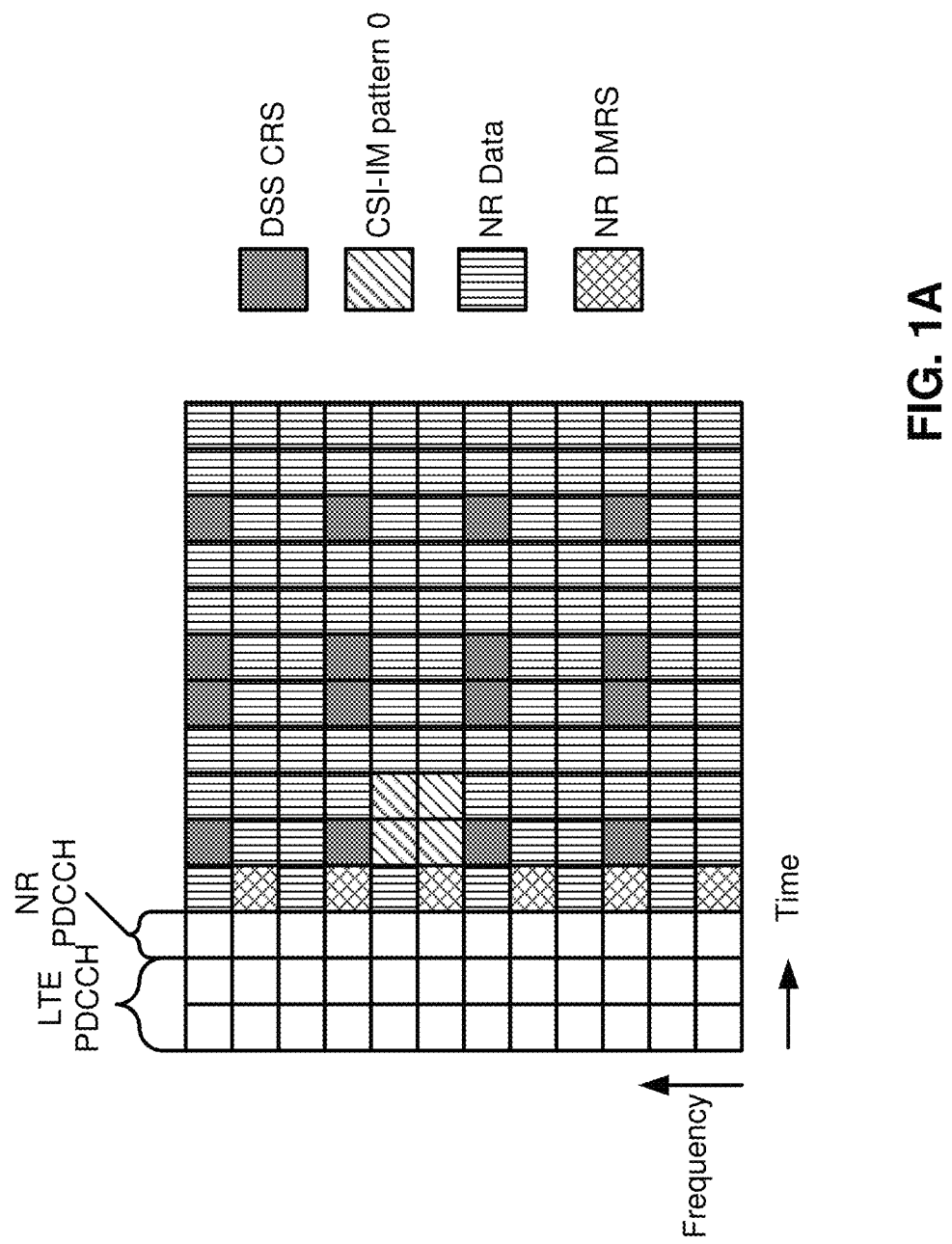
FIGS. 1A and 1B illustrate examples of CRS interfered resource grid(s) with legacy CSI-IM resource patterns overlaid.
Figure 1B:
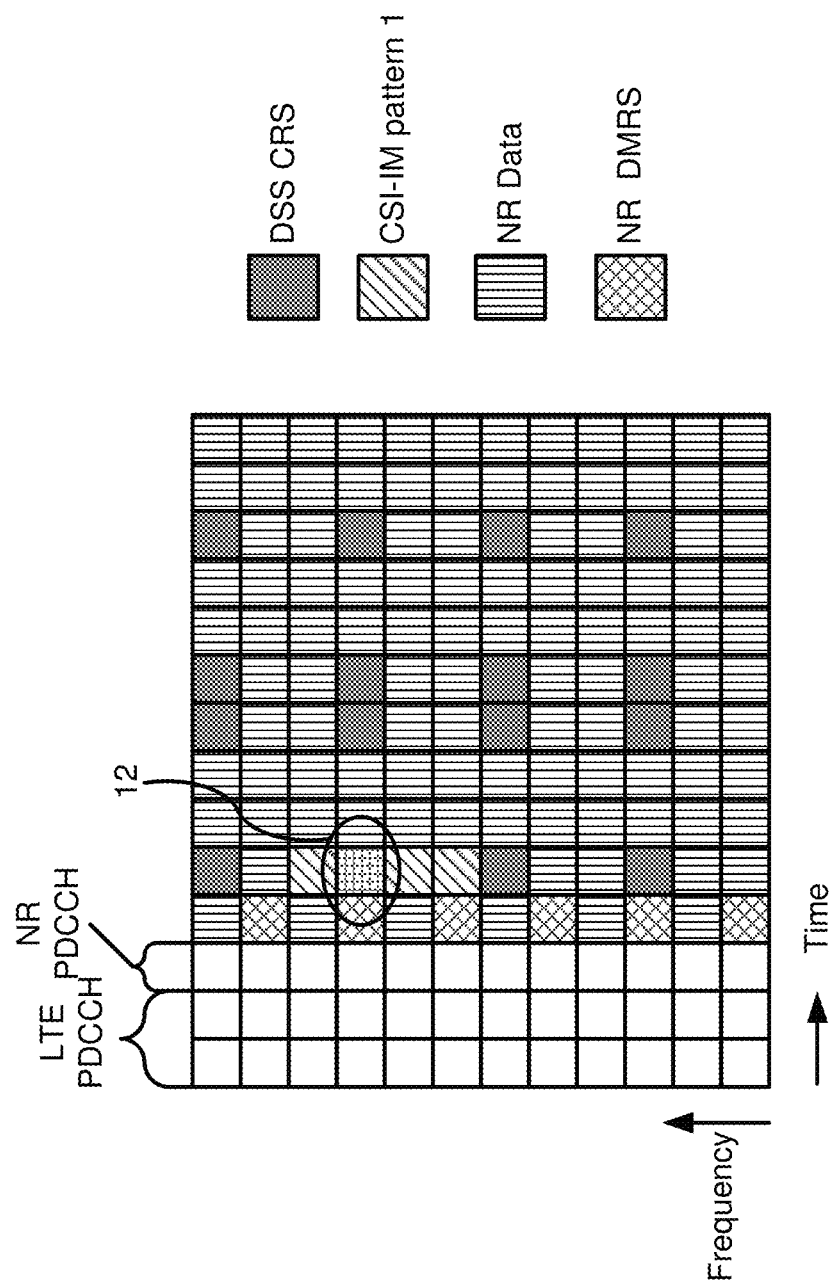

FIGS. 1A and 1B illustrate examples of CRS interfered resource grid(s) with legacy CSI-IM resource patterns overlaid. It can be seen from the figures that the CSI-IM pattern (later also called CSI-IM resource field) in FIG. 1B is not suitable for a DSS cell (e.g., a cell that supports both NR UEs and LTE UEs) and the pattern in FIG. 1A is only two REs can be used for LTE CRS interference detection and/or estimation (the other 2 REs can be used hence they can be considered as waisted or configured for no reason).

For FIG. 1B, it is assumed that CRS for the DSS cell is positioned with vshift 0, meaning the CRS are all positioned as shown in the figure. As CRS is fixed for the DSS cell, reference 12 shows where there will be an overlap between CSI-IM and CRS, hence the pattern is not suitable. Note that the interested CRS to be measured are not shown in this figure as those CRS (from other interference cells) will be placed in the "NR Data" REs on the same row as the CRS from the serving cell. This means the pattern in reference 12 can be used to detect the CRS in the shown position.

Further, CSI-IM is used for interference measurement without telling the UE which type of interference the UE is measuring. Additionally, to increase the accuracy of CRS interference existence and parameters estimation ([mandatory]PCI, vshift, MBSFN pattern, bandwidth, and the like) many CSI-IM and ZP-CSI-RS resources are needed to be defined in the CSI-RS RRC configuration messages. The requires high overhead and higher UE capability in terms of maximum number of supported CSI-RS configurations.

Additional exemplary issues in this technical area are presented now. As previously described, for a NR UE that is CRS-IM capable with traffic/signals that is/are sensitive to delay, e.g., due to the being mobile, one question is whether is it possible to find a more immediate way to detect the dominant LTE interferer, as well as its parameters (if not signaled by the network), without performing Inter-RAT measurements.

This yields a problem as to how one knows, without inter-RAT measurements, the interfering LTE cells' parameters (e.g., existence, interference level, PCI, number of CRS ports, bandwidth, and the like). This is especially true where the interfering LTE cells have CRS "always on" signals for CRS-IM receivers.

This problem is addressed herein under the assumption that no inter-RAT measurements are possible (or at least not preferred) by a UE because for example:

1) A NR UE prefers to not have these measurements (for example NR reduced capability UE, or single-RAT NR UE); or 2) The measurement gap needed for inter-RAT is too time consuming and the UE has NR traffic that is very sensitive to delay.

It is noted that this does not mean that the inter-RAT measurement solutions are disabled for all legacy features. Instead, the network is provided with an additional solution that can be used for at least the use cases mentioned above. Furthermore, the problem is simplified herein and it is assumed that time offset and frequency offset (e.g., detected and compensated by a separate solution) are within acceptable levels and do not cause a problem to CRS-IM receivers of a given UE.

Exemplary techniques herein to address the above and additional issues are based on using a new CSI-RS framework of signaling and measurements feedback with an option either to use new customized CSI-IM patterns (more efficient in terms of RRC signaling and do not require to be assigned with ZP CSI-RS signals) or using the already existing patterns (to limit the specification impact).

The new customized CSI-IM patterns include the following benefits:

1) They are more suitable for CRS interference type;

2) Optionally, when the UE is configured with these new patterns, the UE makes the basic assumption that the interference measurements are for LTE CRS signals; and 3) They could implicitly tell the UE that CSI-IM is also ZP CSI-RS REs for LTE CRS interference estimation.

Specifically, the new patterns may provide differing lengths and widths (e.g., 2 or 3 subcarriers, SCs, and 1 symbol) within the repetition structure. These new patterns make catching of the CRS REs more likely in the context of the instant N1/N2 patterns. Furthermore, previously, the number of CSI-IM patterns was limited. The new patterns provide enough patterns to capture both CRS and other interference.

It is noted that, should the exemplary techniques use the existing patterns (p0 and p1 combined with ZP CSI-RS), then one bit may be added in signaling to the UE to tell the UE that the interference measurements (e.g., power, existence) the UE is performing are for CRS. It is further noted that using the new CSI-IM patterns or already existing ones in the techniques herein may be combined with other signaling IEs to tell the UEs if they need to estimate CRS interference parameters like [mandatory]PCI, [optionally] nPorts, bandwidth, vshift, and the like.

Figure 2:
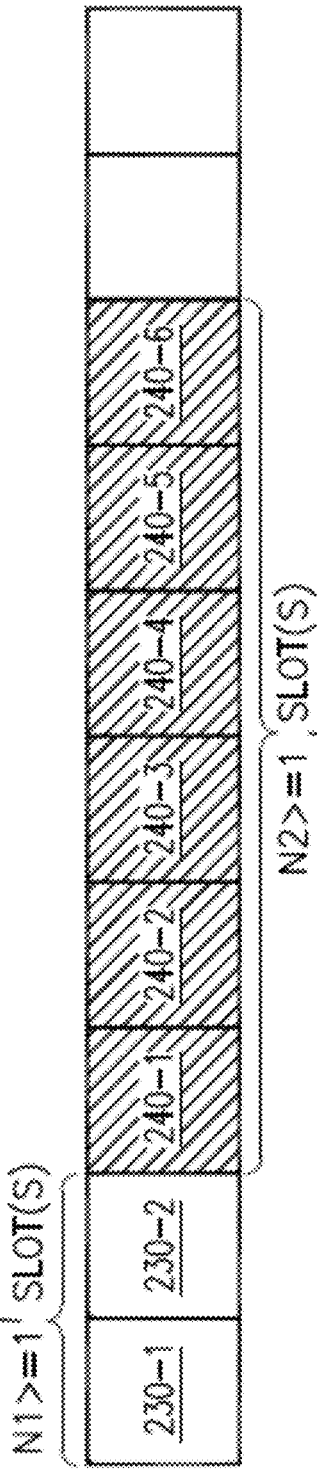
FIG. 2 is an illustration used to provide explanation of the use of N1 and N2 slots in an exemplary embodiment.

A description of one possible set of techniques is now described. These are described with reference to FIGS. 2 and 3.

Inter-cell interference CRS measurements are enabled and defined in the NR UEs, which can be used for CRS-IM on a second set of slots, by the NW configuring the measuring UE(s) with either: (1) a new CSI-IM pattern with or without ZP-CSI-RS or (2) CSI-IM already existing CSI-IM resources' patterns with the needed ZP-CSI-RS resources. Both cover the REs where the potential interferers could exist (and not transmitting NR PDSCH there) and indicating to the UE to perform CRS interference measurement and parameter estimation there.

The gNB may optionally provide the NR UE with a set of RSRP thresholds such that:

a) If UE measurement of the serving cell RSRP is below a certain threshold (e.g., Th1) then no CRS-IM is performed;

b) If the interfering cell RSRP is above a certain threshold (e.g., Th2), then the UE reports, e.g., via L3 measurement report to gNB, and the gNB can rate match (RM) also around this LTE CRS via an additional CRS RM pattern; and/or c) If the interfering cell RSRP is below a certain threshold (e.g., Th3), then the UE implicitly performs CRS-IM and may inform the gNB.

A pattern of slots is defined to ally the configured UE to measure the CRS interference coming from interfering LTE cells. Turn to FIG. 2, which is an illustration used to provide explanation of the use of N1 and N2 slots in an exemplary embodiment. There are N1 slots, where N1 is greater than or equal (>=) to one, and N2 slots, where N2 is greater than or equal (>=) to one.

A pattern of slots is defined, where for the first N1 slots 230 these are configured, using new CSI-IM patterns and signaling, to allow the configured UE to measure the interference coming from the interfering cells. See block 210, where N1 slots 230 are used by the configured NR UEs to estimate the parameters of the LTE interfering cell that is causing interference, if any. The measurements may include one or more of the following:

1) interference level (e.g., and possibly existence of interference), or 2) if not configured by the network, prediction of interferer parameters such as one or more of the following: PCI, number of CRS ports, bandwidth, vshift, and the like.

Concerning existence of interference, this is assumed if interference power level is considered to be high compared to the serving cell power levels (e.g., such as being higher than a threshold in difference) or is higher than a threshold. The interference level may also or alternatively be measured.

In the N1 slots, the UE may be configured with the following:

i) New CSI-IM patterns designed for LTE CRS interference possible patterns. This configuration may include extra parameters to track the CRS interference possible patterns and extra IEs to tell the UE which CRS parameters the UE needs to estimate PCI, nPorts, bandwidth, vshift, and the like.

ii) Same CSI-IM patterns, but with extra parameters to track the CRS interference possible patterns and with extra IEs to tell the UE which CRS parameters the UE needs to estimate PCI, nPorts, bandwidth, vshift, and the like.

3) A combination of the (i) and (ii) above

In terms of signaling overhead, there may be more signaling overhead for (ii), so option (i) may be better in certain situations requiring lower signaling overhead.

The new defined CSI-IM patterns may be assigned with the following: with ZP CSI-RS resources as in legacy patterns; or when configured to the UE, then the UE assumes that PDSCH and/or PDCCH are rate matched around them.

The first N1 slots 230-1 and 230-2 are the measurement slots, which are referred to as CRS-RM slots 230 in the following. Note: In an optional embodiment, a number N_gap of gap slots could be inserted in between N1 and N2, where neither CRS-RM nor CRS-IM is defined.

Consider also the following option. The UE could be configured to report the results of its measurements (e.g., PCI of interfering cell, RSRP of the interfering cell, [optional] number of ports, MBSFN, bandwidth, and the like) performed on the N1 slot (e.g., or averaged over N1 slots).

And the network can use the results of the reported results, for example, to reoptimize the values of N1, N2, which CSI-RS pattern(s) to enable for measurements for the other UEs, and/or which CSI-RS pattern(s) to disable for the same UE during the N2 slots.

In the second set of N2 slots 240 (this example showing 240-1, 240-2, 240-3, 240-4, 240-5, and 240-6), the UE applies the CRS-IM techniques, which are using the measurements in N1 slot(s). See block 220. Note that CRS-IM may not be applied by the UE to MBSFN slots of interfering cells, where no CRS is present. To enable CRS-IM in the N2 slots, the UE may be either:

1) explicitly instructed (at each slot or at the beginning of N2 slots) to ignore (a subset of) the configured CSI-RS patterns, defined over the N1 slots, used before for CRS measurements (the REs defined in these patterns thus become available for data/control signals and are no longer rate matched); or 2) implicitly configured to do so without instruction. For instance, when the UE is scheduled for PDSCH and/or PDCCH in the N2 slots 240, the UE compares the RE(s) available on these slots with the ones that where available on the N2 slots. Then the UE activates its CSI-IM receiver on the REs, where the receiver detects the interference and its parameters. However, still the UE needs to know that a given slot belongs to N2 slots or not.

It is noted that for the explicitly-instructed enablement of CRS-IM in the N2 slots, while not the main focus of the instant techniques, one aspect of how the NW can decide that explicit instruction is to be performed, is by comparing the UE's RSRP of the serving cell versus the average power measured for the CRS REs. At cell edge, e.g., where the power measured would be close to noise level, no interference mitigation needs to be performed, or rather IM is less useful or not useful.

The second N2 slots 240 are the interference cancelation slots, which are referred to as CRS-IM slots 240 in the following. Note that the serving cell could be still RMed in the CRS-IM slot, e.g., when the serving cell has a co-located LTE cell (DSS), e.g., cell planning imposes that some CRS-RM pattern(s) are always active and cannot be turned off. However, not all the three RateMatchPatternLTE-CRS patterns can be enabled on the same slot. A serving cell having a co-located LTE cell (DSS) means the serving and DSS cells are in the same location and NR and LTE are in the same cell using the same FR resources in a DSS configuration.

Figure 3:
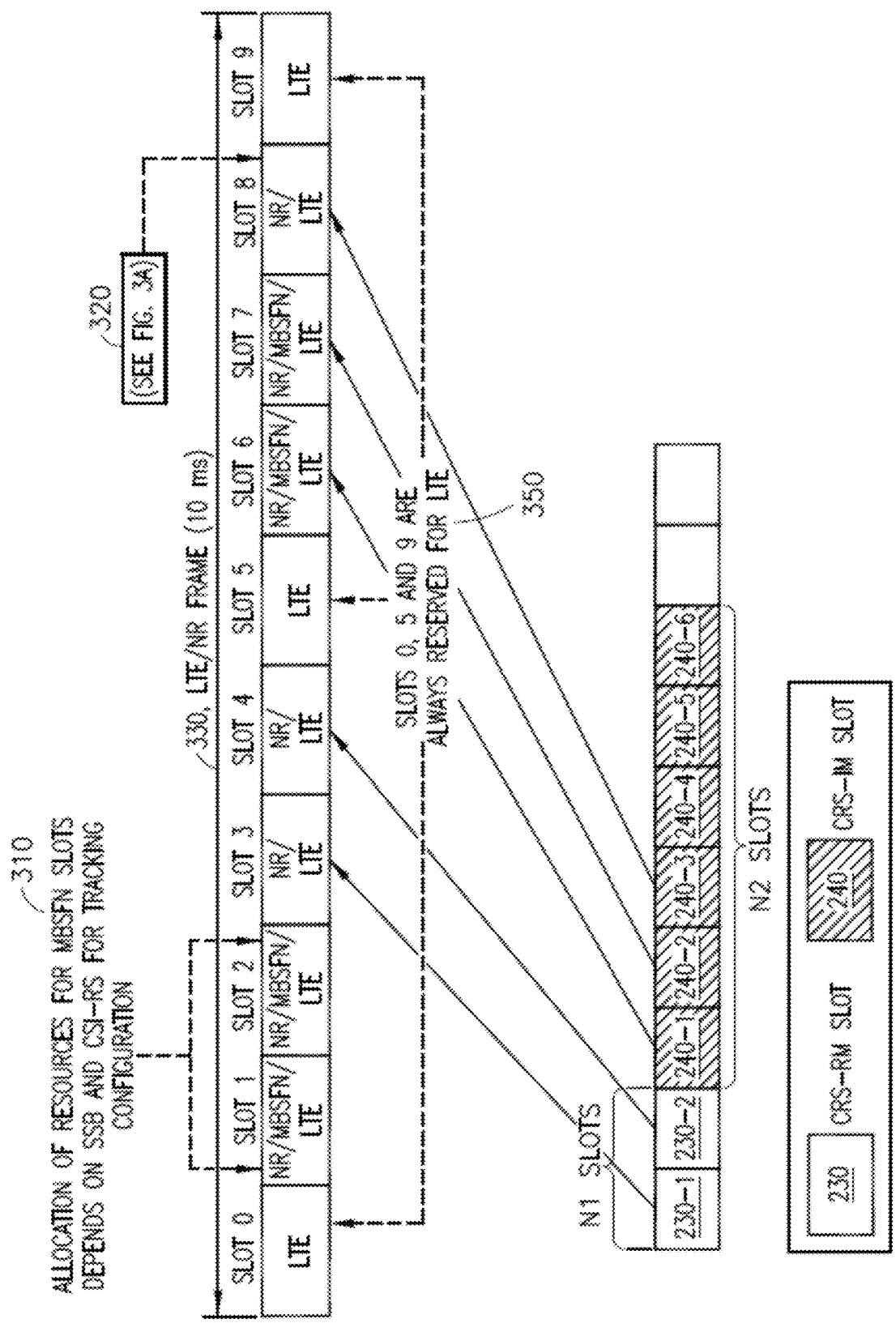
FIG. 3 is an illustrative example of a mapping using an exemplary embodiment.

FIG. 3 shows an example of mapping between N1 slots 230 and N2 slots 240 to an example of an FDD DSS frame 330 (an LTE/NE frame having a 10 ms length and 10 slots numbered 0 through 9) of a serving DSS cell. As can be seen, the slots 3 and 4 forming N1 slots 230-1 and 230-2, respectively, and the slots 6, 7, and 8 forming N2 slots 240-1, 240-2, and 240-3, respectively, do not need to be consecutive in time, and they can be separated for example by UL slots or specific slots used for sending SSBs and CSI-RS tracking signals. Furthermore, the slots forming N2 do not need to be consecutive in time or in the same frame.

Figure 3A:
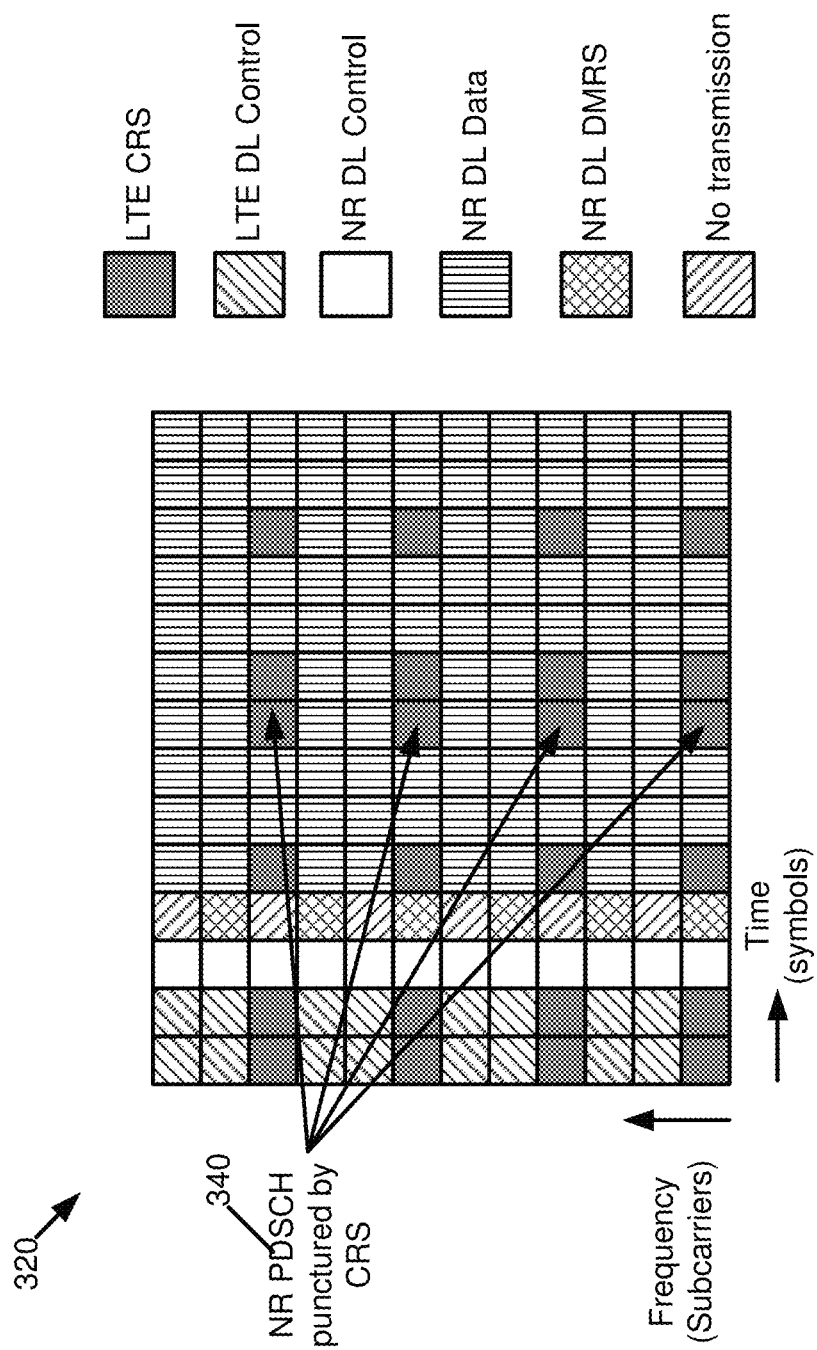
FIG. 3A is an illustration of a time-frequency resource space for a CRS-IM slot from FIG. 3.

The frame 330 has LTE slots at 0, 5, and 9, which are always reserved for LTE in this example. See reference 350. The allocation of resources for MBSFN slots depends on SSB and CSI-RS for tracking configuration, see reference 310. Slots 1, 2, 6 and 7 are NR/MBSFN/LTE, and slots 3, 4, and 8 are NR/LTE. An example of a NR/LTE slot 8 is illustrated as reference 320 in FIG. 3A, which is an illustration of a time-frequency resource space 320 for a CRS-IM slot 240-3 from FIG. 3. Each block in the time-frequency resource space 320 is an RE, and there are 12 REs in the frequency domain, corresponding to 12 subcarriers. There are 14 REs in the time domain, corresponding to 14 OFDM symbols and 1 ms. As indicated by reference 340, NR PDSCH is punctured by CRS in the indicated REs.

Here are some additional remarks on FIG. 3.

1) The NR/MBSFN/LTE slots can be either NR or LTE or MBSFN or any combination thereof between the serving cell and the interfering cell(s).

2) NR/LTE can be either NR or LTE or any combination thereof.

3) The N1 slots are conventionally named as "CRS-RM slots" hereafter.

4) The N2 slots are conventionally named as "CRS-IM slots" hereafter (note that these slots can still use CRS-RM towards the serving cell).

As an example, a main embodiment or use case of the techniques herein can be considered to include explicit network assistance signaling and the UE only predicting/blind decoding PCI. The case of without NWA and predicting DC subcarriers, and the like, could be covered, but this case may be more difficult and measurement inaccuracies might have undesirable cascading effects. As is known, a DC (direct current) subcarrier is the subcarrier in the middle of the allocated SCs, which was left empty in LTE, as the local oscillator (which was tuned to the center SC in LTE) tends to interfere with this SC.

Additional examples are as follows.

Concerning N1>=1. High values of N1 increase the delay to activate CRS-IM. On the other hand, low values of N1 might not allow the UE to have a good estimate of the CRS interference existence and its parameters (especially if not a high enough number of REs is configured to the UE to perform measurements and estimation in a single slot). The choice of the value N1 can be static at cell configuration or dynamic based on the traffic load and/or reported measurements of the UEs. N1 can be a cell-specific parameter or a UE-specific parameter. On these slots, one or more UEs (not only UEs configured for PDSCH) can be configured to perform CRS measurements to detect the LTE interferer and its parameters (e.g., in case of no network assistance supplying these).

Concerning N2>=1. N2 values could be chosen based on how fast interference patterns are changing in the network, and/or based on the speed of the UE, and/or on the reported measurements of the UEs. On these slots, the UE, if scheduled with data (PDSCH), activates its CRS-IM receiver to mitigate the interference on the REs where LTE interferer is detected. Any CRS-IM receiver can be used (LLR weighting receivers, interference cancellation receivers, and the like).

N1 and N2 can be signaled to UE explicitly using semi-static configuration (e.g., via RRC) or implicitly using dynamic signaling (DCIs or MAC CE for example) where the UE can be signaled on slot bases to know if this slot is CRS-RM or for CRS-IM. Much of RRC signaling is called semi-static since it is not static (set only once) nor dynamic (e.g., at each slot or periodic with high frequency). It is noted that, within the N1 slots, the UE can be scheduled with PDSCH (which will be rate matched around CSI-IM resources). Also, the BS (e.g., gNB 170) could request other UEs to perform interference measurements on N1 type slots even if these UEs are not scheduled with PDSCH. Additionally, a UE could see a given slot as N1, while another UE can see the same slot as N2. This is completely controlled by the BS. N1 slots and N2 slots can overlap. The rate of REs assigned for measurements and REs assigned for PDSCH in N1/N2 slots is also controlled by the BS.

N1 slots could be consecutive or nonconsecutive slots. Similarly, N2 slots could be consecutive or nonconsecutive slots.

Scheduling of UEs on the N2 CRS-IM slots 240 can be performed:

based on the UEs reported measurements performed over the N1 slot, where CRS interference pattern reports are mandatory in this case; or such that they are fixed in advanced with N1 and N2 slots and with all needed signaling without asking the UE to report measurements, where CRS interference pattern reports are optional in this case.

Figure 4:
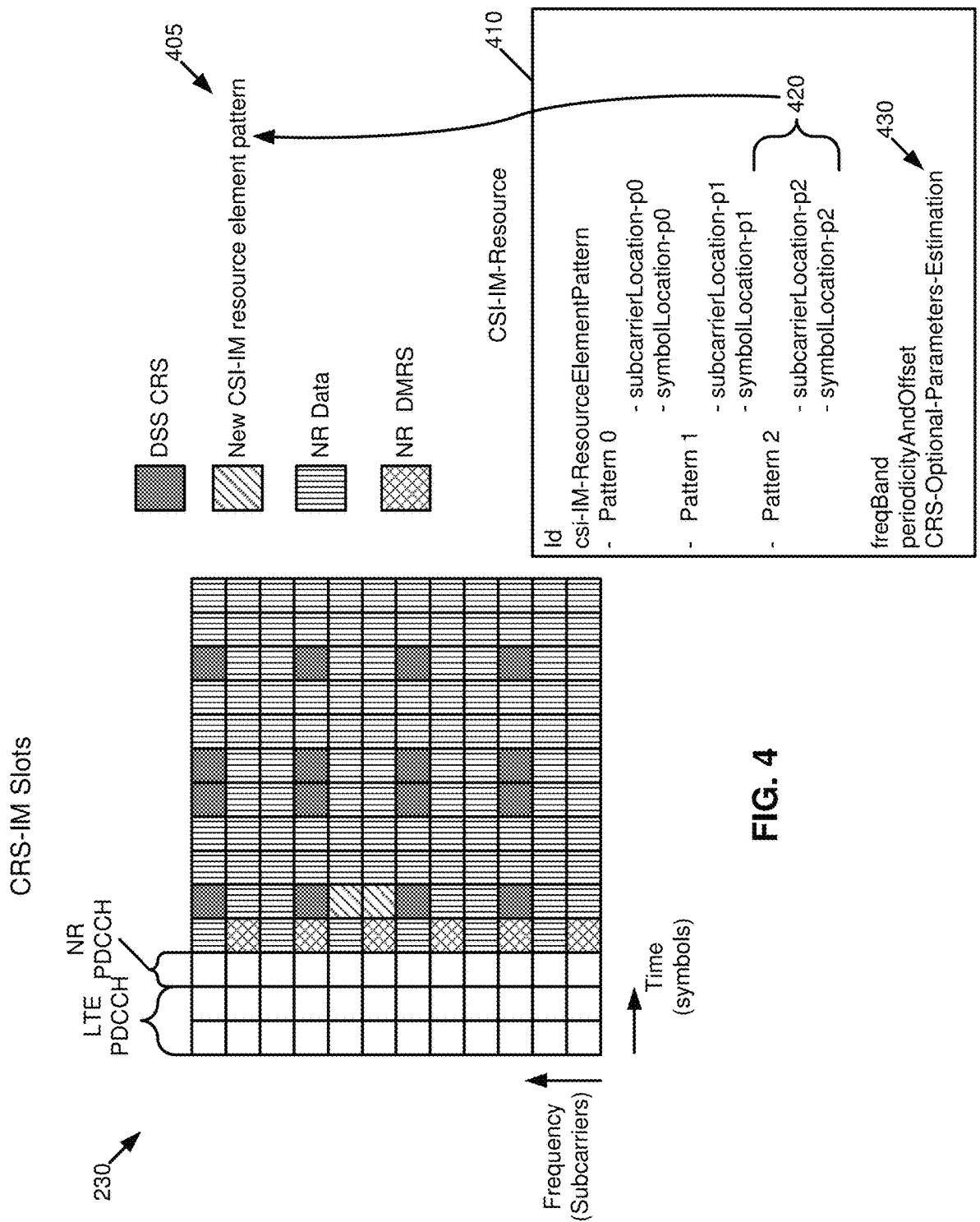
FIG. 4 illustrates an example of a CSI-IM slot one PRB, in accordance with an exemplary embodiment.

An example of how a CSI-IM slot one PRB could be configured is shown in FIG. 4. In this example, a new CSI-IM pattern referred to as pattern 2 is introduced. The new CSI-IM resource element pattern 405 is defined by pattern 2 of the CSI-IM resource 410 (where both Pattern 0 and Pattern 1 also exist). Pattern 2 420 includes two REs and, once configured, the UE can by default assume interference measurement is for LTE CRS. Pattern 2 420 has empty REs, and other REs in the same symbol may be assumed to be non-empty.

The illustrated DSS CRS is used for DSS (where a cell serves both NR and LTE UEs). Additionally, as another example, UEs can be configured to use the new CSI-IM pattern 2 420 for CRS interference measurements.

This new pattern 420 enables the UE to detect and estimate parameters of CRS for up to two non-colliding CRS interferers.

This new pattern may be defined in the RRC message field CSI-IM Resource as a new option (before it was only possible to have Pattern 0 or Pattern 1). This new pattern 420 has two REs, and it can be combined with repetition patterns in time and frequency in one PRB as the next example shows.

When the UE is configured with Pattern 2 420 then the UE knows by default that it is searching for CRS interference and with an extra configuration parameter (see CRS-Optional-Parameters-Estimation 430), the UE can know if it needs to search for CRS interference parameters. The flag CRS-Optional-Parameters-Estimation 430 is used to tell the UE if CRS pattern parameters (nPorts, MBSFN frame pattern, bandwidth, and the like) need to be estimated or not.

Figure 5:
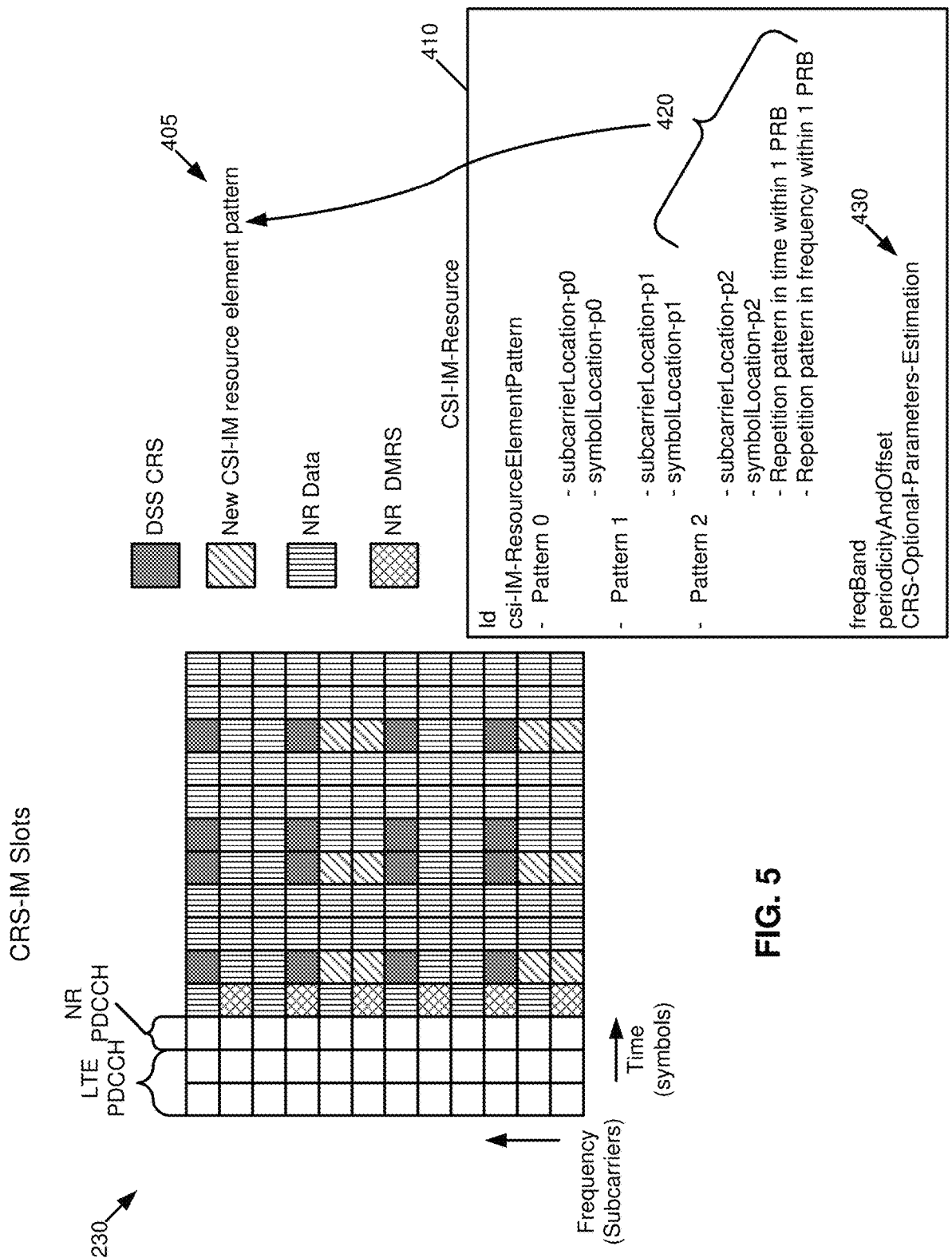
FIG. 5 illustrates another example of a CSI-IM slot one PRB, in accordance with an exemplary embodiment.

Another example of a way a CSI-IM slot PRB could be configured is as shown in FIG. 5. In this example, more resources within 1 PRB are enabled in CSI-IM slot 230 for measurements that make the measurements more accurate. In these proposed new CSI-IM Resource IEs, the BS does not need to send too many CSI-IM-Resources fields to the UE which makes the RRC signaling overhead much less than sending for example 6 CSI-IM-Resources fields to configure the same pattern.

Adding IEs to control the frequency and time repetition patterns within 1 PRB (see in pattern 2 420 the repetition in pattern in frequency within 1 PRB and the repetition in pattern in frequency within 1 PRB) enables the BS to control the level of REs available for measurements in a more efficient way than before.

Figure 6:
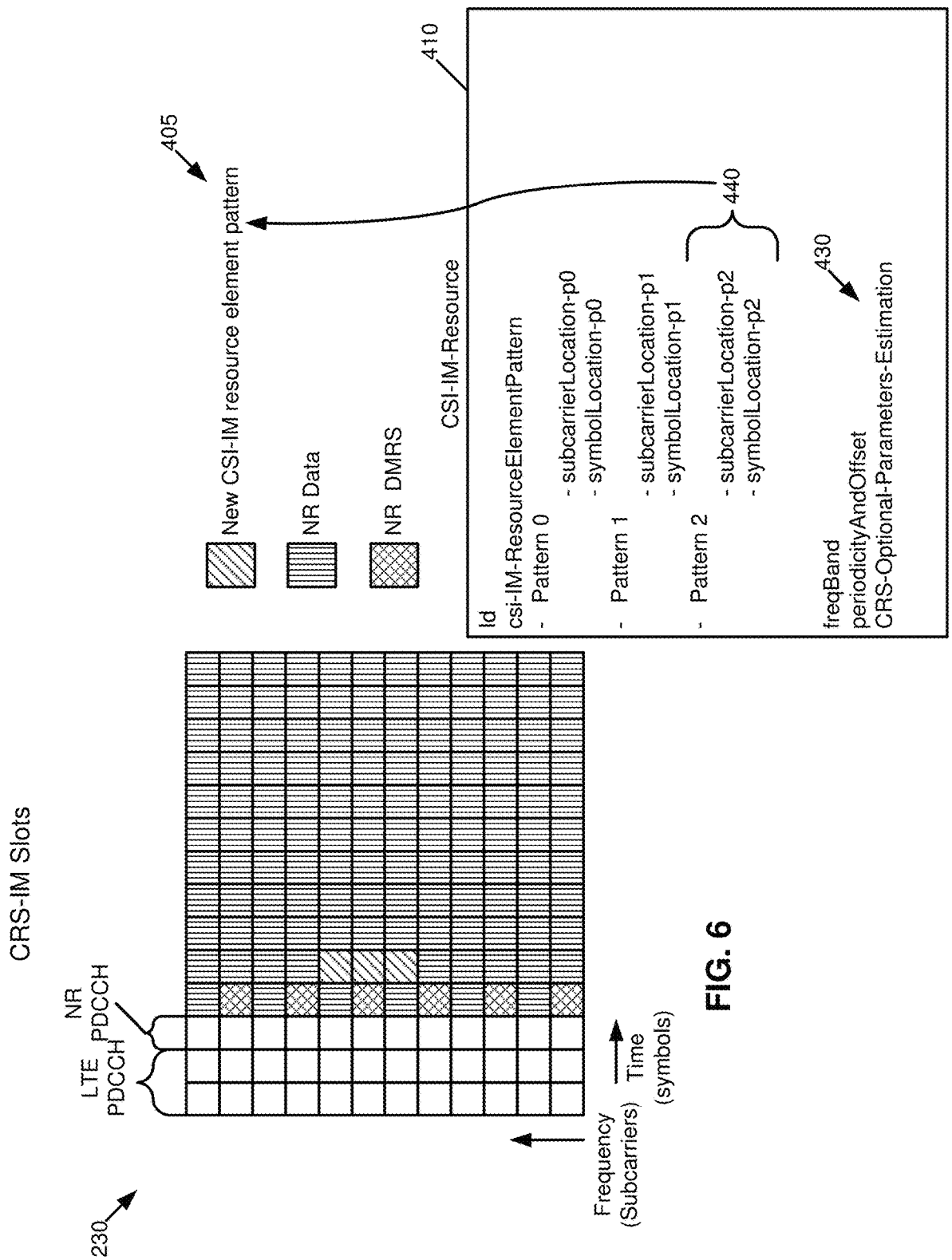
FIGS. 6 and 7 illustrates yet other examples of a CSI-IM slot one PRB, in accordance with exemplary embodiments.

Yet another example of a way a CSI-IM slot PRB could be configured is as shown in FIG. 6. Pattern 2 440 is another new pattern that contains 3 REs and this pattern is suitable for pure NR cells surrounded with at least 3 CRS interferences with different vshift. The Pattern 2 440 includes empty REs, and the other REs in the symbols are assumed to be non-empty. Similar to Pattern 2 420, Pattern 2 440 may have IEs to control the frequency and time repetitions patterns within 1 PRB. These are not shown in FIG. 6, but see FIG. 5 for examples.

Figure 7:
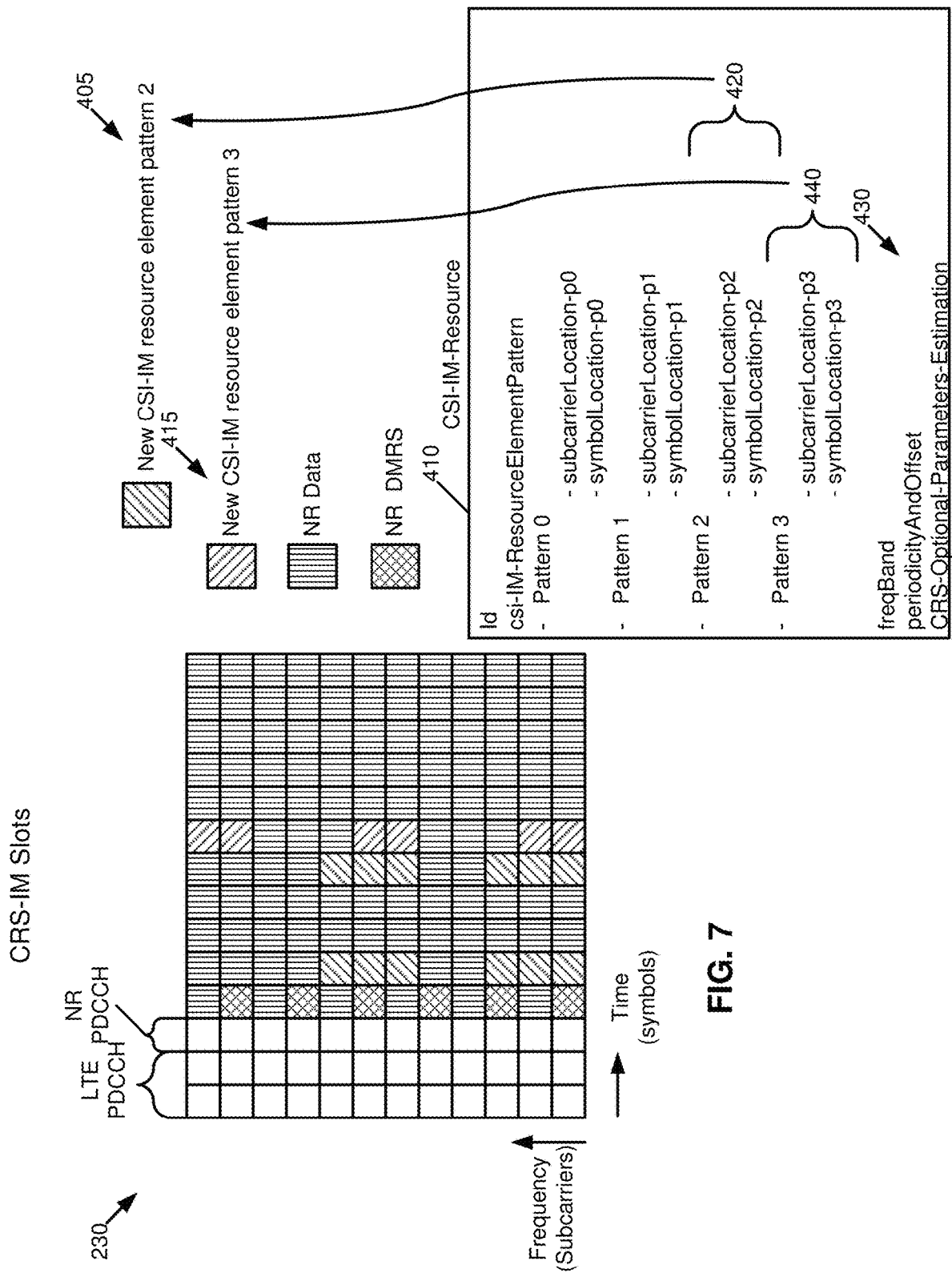

FIG. 7 illustrates yet another example of a CSI-IM slot one PRB, in accordance with another exemplary embodiment. In this example, it is shown how flexible or proposed patterns can be, where pattern 2 405 can be used to detect CRSs interfering signals with 4 ports and pattern 3 415 can be used to detect CRSs interfering signals with 2 ports.

Figure 8:
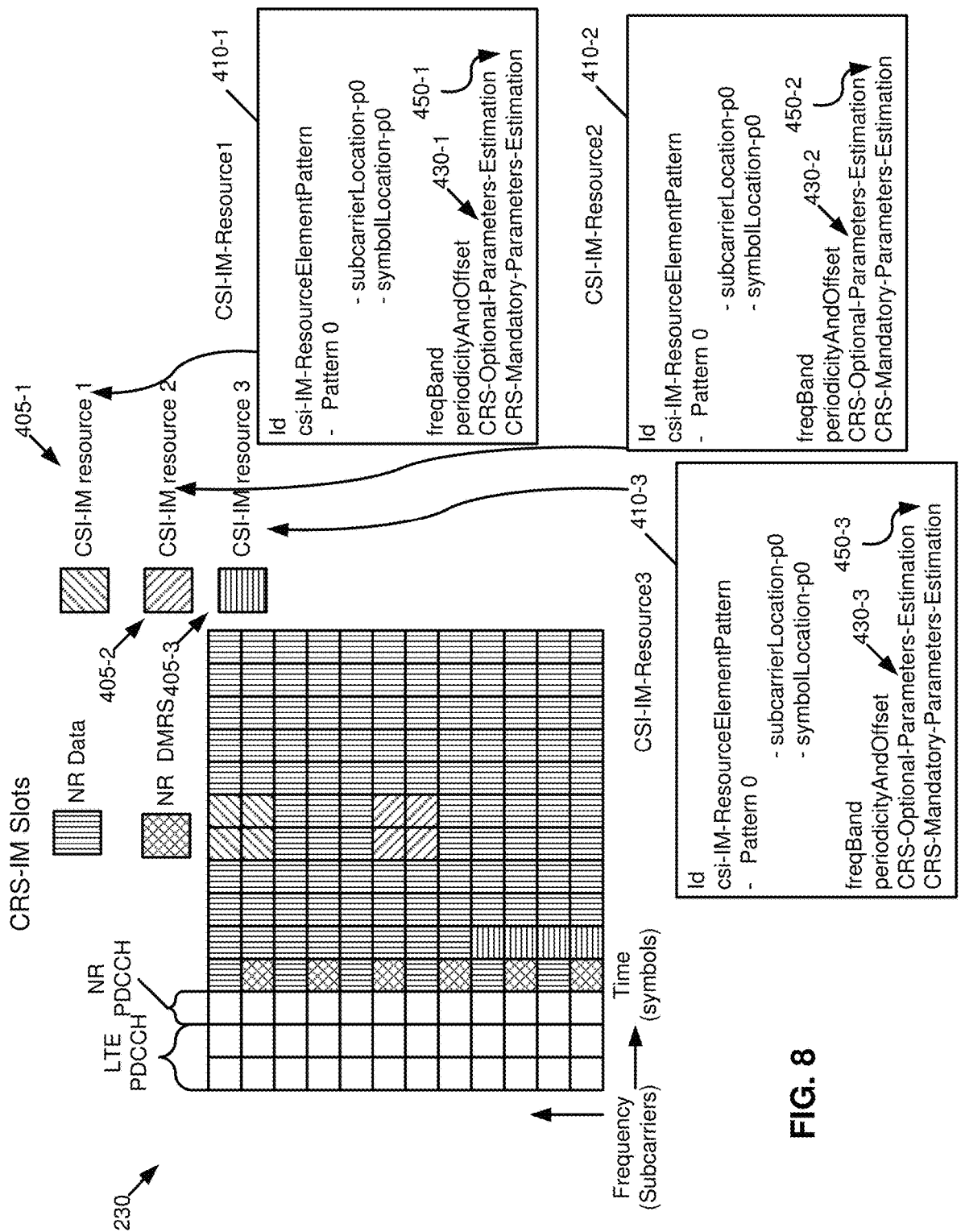
FIG. 8 illustrates an example of CSI-IM slot one PRB in accordance with an exemplary embodiment.

Another option is now described that does not require introducing new patterns of CSI-IM resources (namely patterns 2 and 3), but instead relies on configuring the UE with many CSI-IM resources 410 to obtain enough REs to improve the CRS parameter estimation, combined with flags to activate the mandatory CRS parameters estimation and optional ones. This option might be less favorable than others, due to the number of CSI-IM resources that are configured. FIG. 8 shows an example of configuring 3 CSI-IM resources 410-1, 410-2, 410-3, corresponding to CSI-IM resources 1 405-1, 2 405-2, and 3 405-3 indicated in the N1 slot 230, to have 8 subcarriers per PRB to use for CRS interference existence and parameters estimation, i.e., covering the REs that can contain the 4 CRS ports of LTE.

One goal with a configuration such as in FIGS. 7 and 8 is to have eight of the 12 subcarriers of the PRB covered. Not just any eight, but those that can be covered by CRS of differing port number configurations (n1, n2, n4). The REs do not need to be on the same symbol, as long as they cover the symbols where CRS are possible, e.g., the 5th 8th, and 9th symbols (other combinations are also possible). 3GPP TS 36.211 FIG. 6.10.1.2-1A is one example that illustrates LTE cell-specific reference signals (CRS) for antenna configurations (vertical axis) and ports (horizontal axis), and each resource grid illustrates where there are REs transmitting RSs. Four REs (as in FIG. 7) could be sufficient for measuring interference in the structure in FIG. 6.10.1.2-1A, but covering the whole PRB "equally" is advantageous from a measurement point of view.

Using the example of FIG. 8, it is noted that CSI-IM Resources 2 (410-2) and 3 (410-3) overlap with the REs transmitting RSs in FIG. 6.10.1.2-1A of 3GPP TS 36.211. The CSI-IM-Resource 1 (410-1), however, does not. In some implementations, it may be useful to establish a no-CRS reference level, to determine whether CRS is present in another set of resources. CSI-IM-Resource 1 (410-1) performs this function in this example.

Each CSI-IM-Resource 410 (410-1, 410-2, 410-3) has corresponding flags CRS-Optional-Parameters-Estimation 430 (430-1, 430-2, 430-3) and CRS-Mandatory-Parameters-Estimation 450 (450-1, 450-2, 450-3), which indicate optional and mandatory, respectively, CRS parameters for estimation. In an example, CRS-Optional-Parameters-Estimation 430 is a new flag that is added in the CSI-RM configuration RRC signaling to inform the UE to estimate the optional parameters of LTE CRS interference (e.g., nPorts, vshift, MBSFN patterns, bandwidth, and the like). CRS-Mandatory-Parameters-Estimation 450, in an exemplary embodiment, is used if the new CRS-IM patterns 2 and 3 are not used. This new flag is added in CSI-RM configuration RRC signaling to inform the UE to detect the LTE interferer and detect its mandatory parameter PCI.

Figure 9:
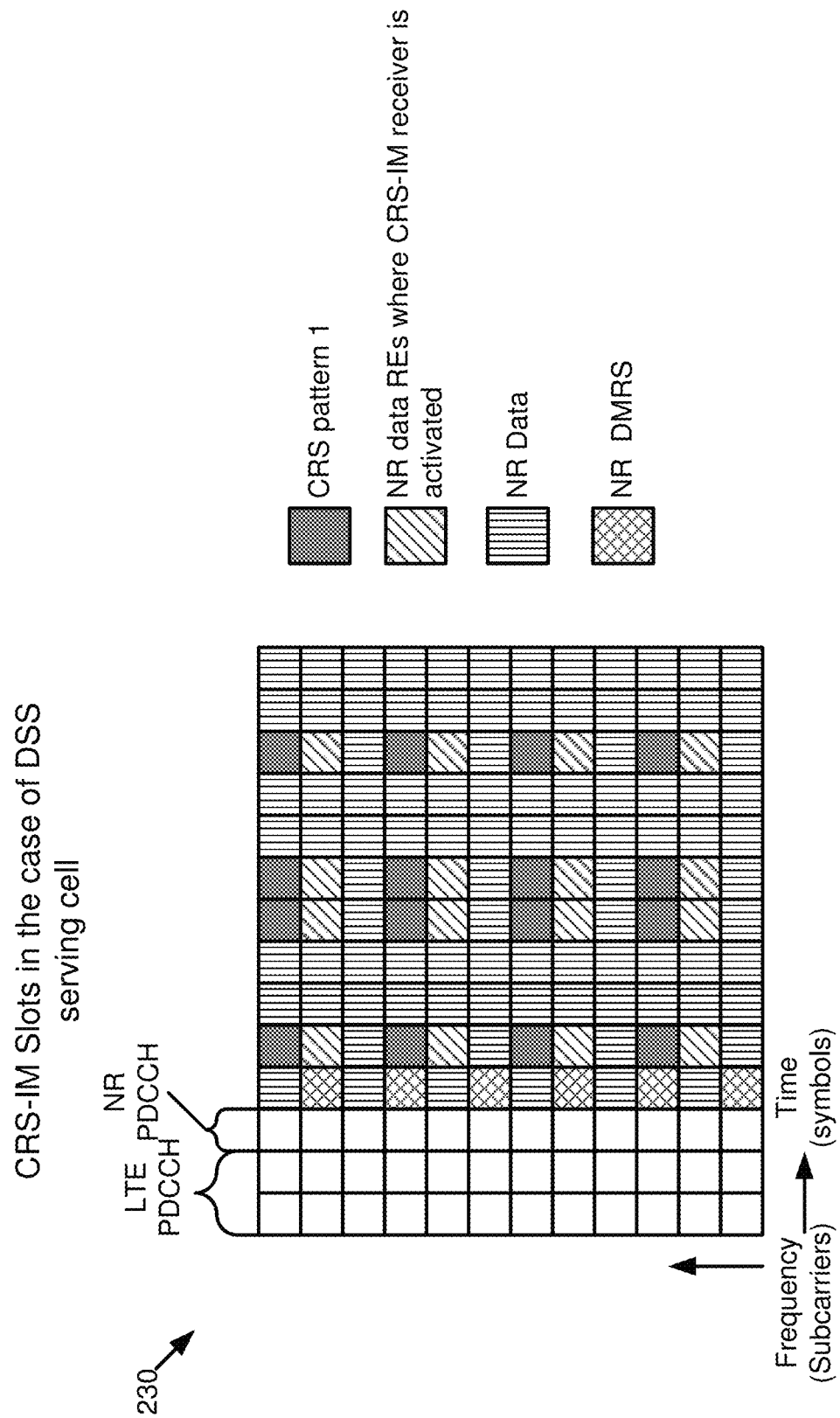
FIG. 9 illustrates an example of a CRS-IM slot PRB, in the case of a DSS serving cell, which could be configured as shown in an exemplary embodiment.

FIG. 9 illustrates an example of a CRS-IM slot PRB, in the case of a DSS serving cell, which could be configured as shown. In this example, one CRS interference pattern was detected during the N1 slots with nPort=4. Hence its interference mitigation is activated on the CRS-IM slots during the N2 slots. It is noted that the UE can optionally inform the network about the detected interferer (e.g., LTE PCI) and its parameters (number of ports, vshift, and the like).

Figure 10:
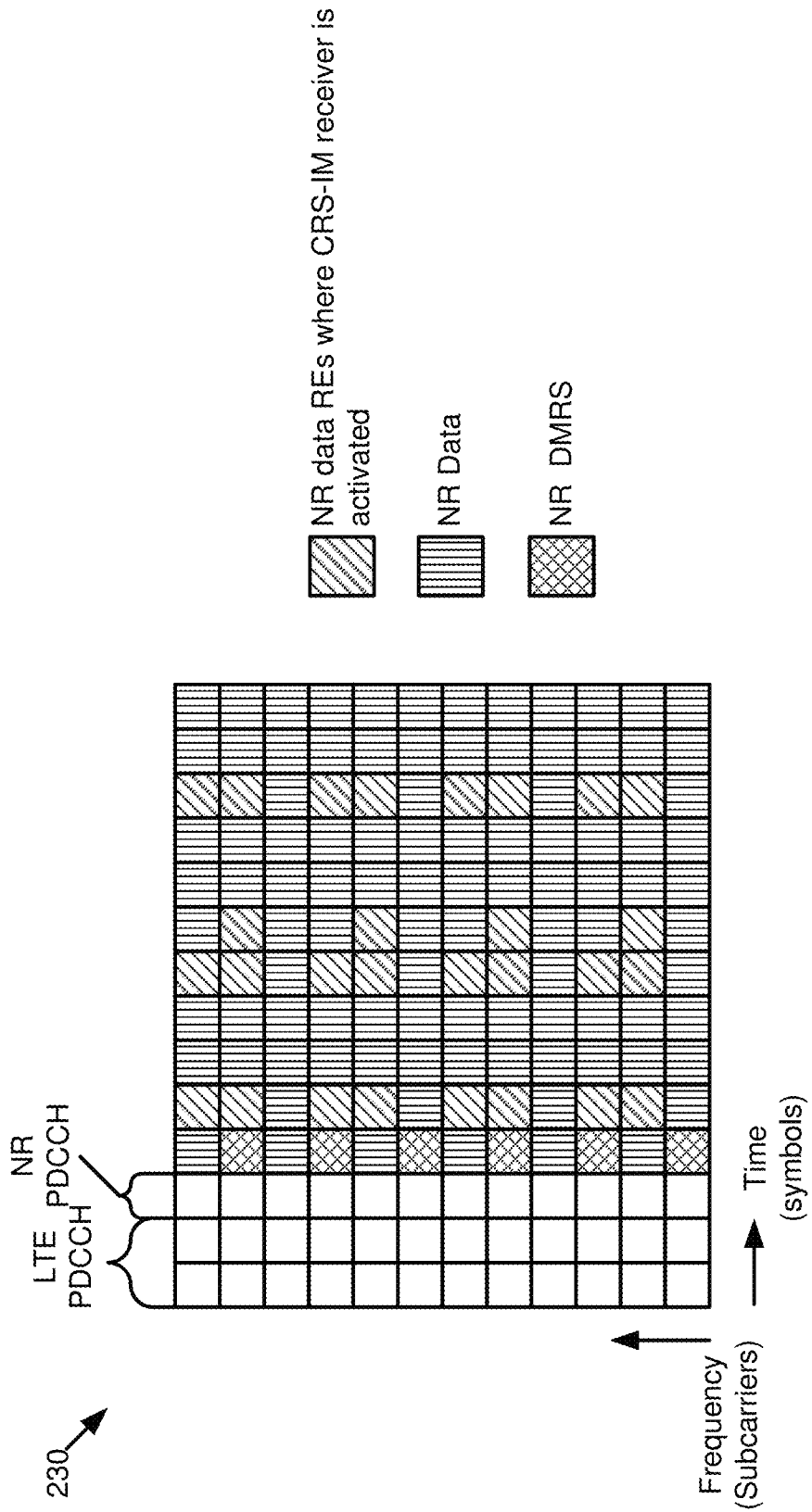
FIG. 10 illustrates an example of CRS-IM slot one PRB in a case of pure NR cell or DSS cell MBSFN frame, in accordance with an exemplary embodiment.

Another example of a way CRS-IM slots PRB could be configured to be is as shown in FIG. 10. This CRS-IM slot is in case of pure NR slots or a DSS cell with and MBSFM slot. In this example, two CRS interference patterns are detected during the N1 slots 230 (with different values of vshift and nPorts) and their interference mitigation is activated on the CRS-IM slots during the N2 slots 240.

Figure 11:
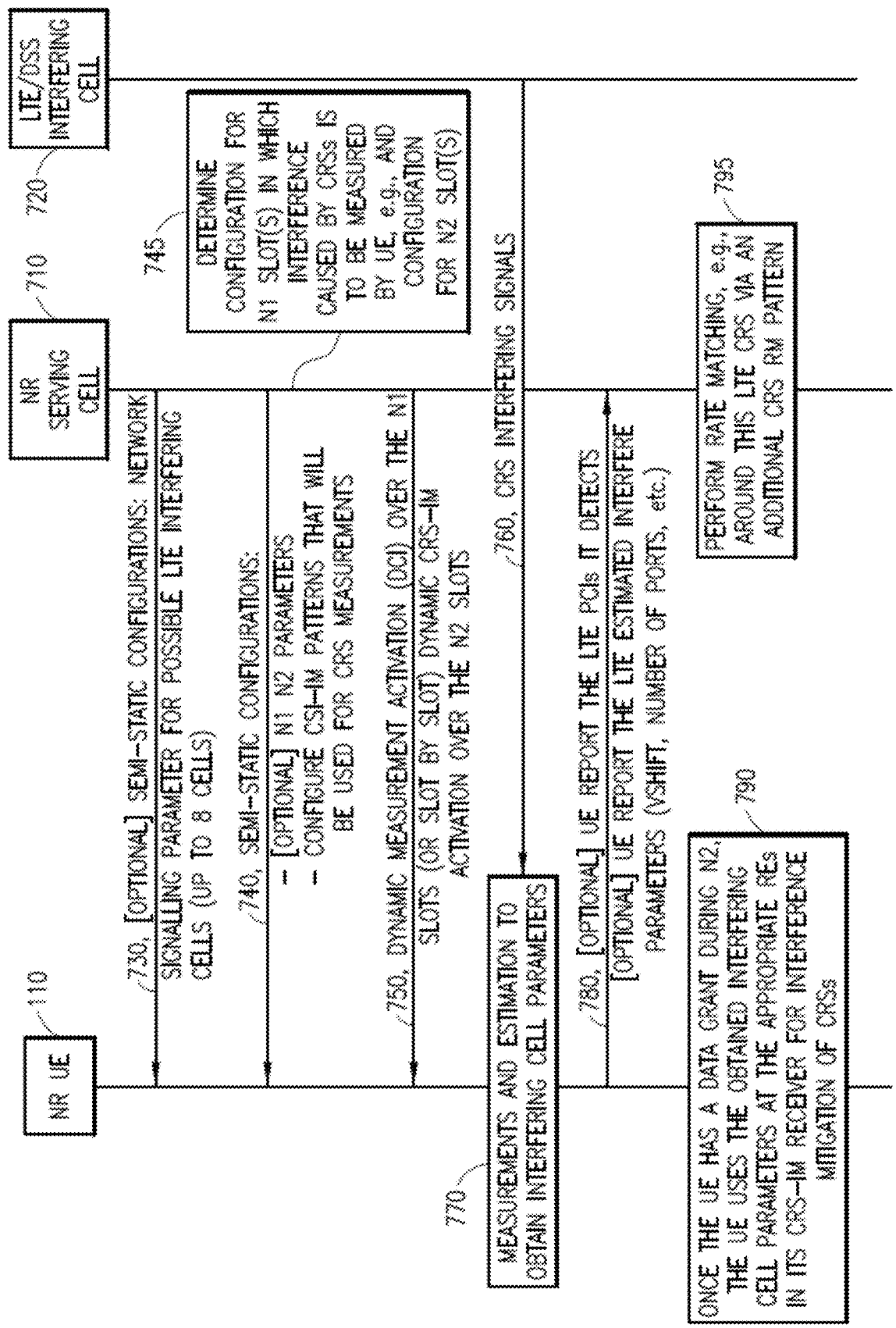
FIG. 11 illustrates a signaling and flow diagram for CSI assisted CRS-IM advanced receivers, in accordance with an exemplary embodiment.

FIG. 11 illustrates a signaling and flow diagram for CSI assisted CRS-IM advanced receivers, in accordance with an exemplary embodiment. A NR UE 110 is illustrated, as are a NR serving cell 710 (e.g., formed by gNB 170 of FIG. 1), and an LTE/DSS interfering cell (e.g., formed by eNB 170-1 of FIG. 1). FIG. 11 also illustrates the operation of an exemplary method, a result of execution of computer program instructions embodied on a computer readable memory, functions performed by logic implemented in hardware, and/or interconnected means for performing functions in accordance with an exemplary embodiment. The NR UE 110 performs its operations as implemented at least by the control module 140, and the gNB 170 (forming the NR serving cell 710) performs its operations as implemented at least by the control module 150.

There are many estimation methods one could think of which enable the NR UE to estimate the presence of LTE CRS interference and to detect the LTE CRS interference parameters (in case of no network assistance or partial network assistance).

For example: a UE may estimate the PCI using blind decoding of up to N PCI. The following are possible embodiments.

1) Use one PCI from the list then generate the CRS sequence based on the PCI, then perform autocorrelation.

2) The UE choses the PCI with highest autocorrelation value that is above a configured threshold.

3) If no autocorrelation value is higher than a threshold, then the UE is not seeing interference.

4) An additional possible technique, averaging over N1 slots is performed using a measurement filter.

The value for N and the list of neighboring LTE cells is provided by the serving BS in case of NWA. N=503 in case of no NWA. However, the UE does not need to perform a blind search of all PCIs. Instead, the UE could apply cleverer methods if possible. For example, the UE could use the list of previously found LTE cells during cell search or inter-RAT measurements the UE executed in the past. In another embodiment, the UE could try estimating first the last LTE cell that the UE was handed over from LTE to NR.

In case of NWA, e.g., without an inter-RAT measurement object configured, the prediction and reporting (e.g., of a number of ports, bandwidth, center frequency, and MBSFN pattern of the founded LTE interfering cell) are not needed in case of NWA framework. This is true unless the UE detected an interfering cell that is not listed in the NWA signaling. For this detected cell, the UE will assume no NWA. The network can provide the NWA to the UE based on having the configuration (or based on inter RAT measurements performed by UEs recently in the cell for mobility purposes; but no specific IM focused inter RAT MO is configured).

In case of no NWA, e.g., with inter-RAT measurement object configured or completely blind processing, the following may be performed.

1) In case of no NWA, the prediction and reporting of these parameters (e.g., a number of ports, bandwidth, center frequency, and MBSFN pattern of the found LTE interfering cell(s), vshift, and possibly CellID) are optional and in this case the UE needs to try to estimate these parameters.

2) Regarding prediction and reporting of bandwidth, CSI-IM resource IE already has a field to define the pattern across the PRBs called freqB and of type CSI-Frequency-Occupation. And this field could be used to tell the UE the BW that the UE needs to apply its prediction/estimation process in that BW.

3) Regarding prediction and reporting of number of ports, when the BS asks the UE to estimate the number of ports then the UE could use try and error there is at most three options for nrofCRS-Ports (number of CRS ports) and this is not a complex task if there is no NWA.

4) Regarding prediction and reporting of the center frequency, the UE could use, e.g., power detection (e.g., exploiting that NR DL uses the DC sub carrier and LTE doesn't and in LTE the DC carrier is always in the middle of the CC) or use its previously executed inter-RAT measurements, which previously detected this interfering LTE cell (a UE needs a memory to save the old inter-RAT measurements, however). It is noted that the UE, based on the BWP assigned to it by its serving NR cell, could search for one or more LTE cells with their corresponding DC carrier and BW. For example: if the UE BWP is 30 MHz and 2 LTE cells of 20+20 or 20+10 are interfering to this BWP, then the UE will detect 2 DC subcarriers and 2 BW using the assumption that LTE cell BW cannot exceed 20 MHz.

5) Regarding prediction and reporting of MBSFN pattern, the prediction of MBSFN pattern without NWA is not an easy task (even improbable without high delay and high measurements over long periods from cell edge UEs). Hence, it is preferred that the serving cell provide its UEs with MBSFN pattern either directly in NWA (in case it is supported) or implicitly and dynamically in the N2 slots when the NW configures the UE with data and a flag to apply CRS-IM receiver or not for a given PCI. In the extreme use case (border of a country and/or different operators for example), NR may not be able to assume anything about MBSFN configuration without asking some of its UEs (those that can detect the cross-country PCIs) to decode SIB2 and report the MBSFN pattern with the detected PCI. Then the serving cell keeps a LUT for the PCI and its MBSFN pattern to indicate this to its UEs. Finally, if no such UEs exists, then since the BS is the master in choosing N1/N2 slots and in configuring the measurements to be performed on these slots, then the BS evaluates if it is beneficial or not to ask a given UE (or set of UEs) to estimate MBSFN pattern (or a given slot is MBSFN or not) to the best of its (their) knowledge, and ask them to report these estimated MBSFN pattern. Then the BS collects these measurements and try to predict the MBSFN pattern.

The UE could employ a long measurement cycle background measurement and this data would be used in lieu of predicting/blind decoding when no NWA is available. The long measurement cycle would reduce the impact from measurement gaps allow for more accurate cell interference measurements and the proposed N1/N2 scheme would allow for dynamically mitigating the interference It is noted that, in the corner use case of border of a country with different operators where coordination between NR and LTE network is not possible, CRS-IM activation might not be needed because normally, in this use case, the UE density in cells is not high and interference of CRS signals will not be a limiting factor in cell throughputs.

In step 730, the NR serving cell 710 sends to the UE 110 semi-static configurations including a network signaling parameter(s) for possible interfering cells, e.g., up to 8 cells, although more or fewer cells could be used. The parameters are for the surrounding cells, which are candidates for being interferers to the UE. The exact list of parameters is expected to be specified in 3GPP, and the parameters are expected to include one of more of the following: PCI; number of CRS ports; bandwidth; vshift; MBSFN pattern; and others. Step 730 might be optional.

In step 740, the NR serving cell 710 sends semi-static configurations, including one or more of the following: 1) N1 and N2 parameters (which may be optional); 2) configuration CSI-IM patterns that will be used for CRS measurements. In step 745, the NR serving cell 710 determines configuration for N1 slot(s) in which interference caused by CRSs is to be measured by the UE, e.g., and configuration for N2 slot(s).

In step 750, the NR serving cell 710 sends dynamic measurement activation (e.g., using DCI) over the (e.g., one or more of) N1 slots (or slot-by-slot); and/or dynamic CRS-IM activation over the (e.g., one or more of) N2 slots (or slot-by-slot). This may be performed using a specific command which can be static/semi-static/or dynamic.

In response to these messages, the NR UE 110 performs (step 770) measurements and estimation to obtain interfering cell parameters. Step 770 is performed while (step 760) the LTE/DSS interfering cell 720 sends CRS interfering signals, e.g., in one or more CRS-RM slots 230. In step 780, the UE reports the LTE PCIs that are detected; and/or the UE reports the LTE estimated interference parameters such as, e.g., one or more of PCI, number of CRS ports, bandwidth, vshift, MBSFN pattern, and the like. Step 780 may be considered to be optional. In step 790, once the UE has a data grant during an N2 slot (e.g., CRS-IM slot 240), the UE uses the obtained interfering cell parameters at the appropriate REs in its CRS-IM receiver for interference mitigation of CRSs. In block 795, the NR serving cell 710 may perform rate matching, e.g., around this LTE CRS via an additional CRS RM pattern, e.g., based on the report(s) in signaling 780.

It is noted that, using the new CSI-IM patterns or already existing ones in the techniques herein, may be combined with other signaling IEs to tell the UEs if they need to estimate CRS interference parameters like [mandatory]PCI, [optionally] nPorts, bandwidth, vshift, and the like.

It is further noted that in the techniques herein, it is assumed that the NR cells are capable of knowing the parameters the CRS interference parameters from the PCI of the LTE cell using one of the following methods depending on the use case:

1—The coordination interfaces between LTE and NR cells (X2/Xn or any other interface) for example if they are under control of the same operator; or 2—NR cells keep a LUT that is updated based on the inter-RAT measurements and/or the signaling framework described above from some of the UEs connected to the NR cells.

a. Some of the UEs when they perform inter-RAT measurements, they could provide the NR cell with carrier frequency, bandwidth, noPorts (number of ports) of the detected LTE cell. If these UE decoded SIB2, then they could also provide the NR cell with MBSFN frame pattern.

b. Some of the UEs when they perform measurements based on the techniques herein could provide the NR cell with carrier frequency, bandwidth, noPorts of the detected LTE cell, and an estimate of what could be an MBSFN pattern.

Figure 11A:
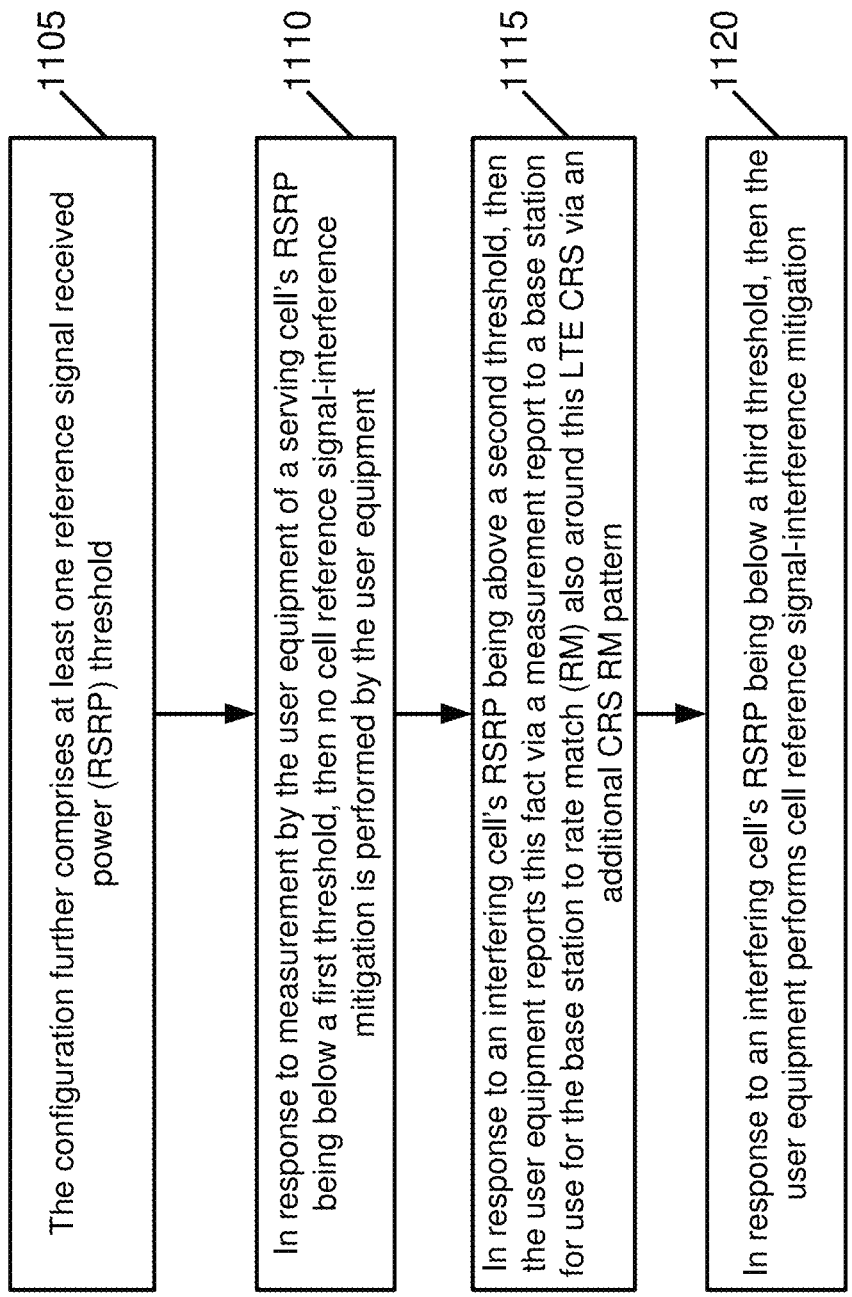
FIG. 11A illustrates a flow diagram for examples using one or more reference signal received power (RSRP) thresholds.

Turning to FIG. 11A, this figure illustrates a flow diagram for examples using one or more reference signal received power (RSRP) thresholds. In block 1105, the configuration further comprises at least one reference signal received power (RSRP) threshold, which could be performed in signaling 730 or 740 of FIG. 11. Blocks 1110-1120 illustrate when multiple RSRP thresholds are used.

In block 1110, in response to measurement by the user equipment of a serving cell's RSRP being below a first threshold, then no cell reference signal-interference mitigation is performed by the user equipment. This could be part of block 770 of FIG. 11. In block 1115, in response to an interfering cell's RSRP being above a second threshold, then the user equipment reports this fact via a measurement report to a base station for use for the base station to rate match (RM) also around this LTE CRS via an additional CRS RM pattern. This could be implemented in part by signaling 780 in FIG. 11, and the rate matching could occur in block 795. In block 1120, in response to an interfering cell's RSRP being below a third threshold, then the user equipment performs cell reference signal-interference mitigation. This can form part of block 790 of FIG. 11.

Without in any way limiting the scope, interpretation, or application of the claims appearing below, a technical effect and advantage of one or more of the example embodiments disclosed herein include the following: These techniques provide faster interfering LTE cell detection than inter-RAT measurement, which require measurement gap, and this is beneficial for:

UEs with high demanding traffic in terms of latency;
UEs which are not capable of doing int-RAT measurement (for example RedCap UEs, or pure NR UEs);
Using CSI-IM signaling, which also enables:
the UE to know that it is measuring CRS interference; and/or
having more adapted interference measurements patterns suitable for the structure the way CRS signals are transmitted in LTE.

The following are additional examples.

Example 1. A method, comprising:

receiving, at a user equipment, configuration for one or more interference mitigation patterns indicating which resource elements in a time-frequency resource space should be measured; and performing interference measurements, by the user equipment, based on the received one or more interference mitigation patterns.

Example 2. The method according to example 1, wherein the configuration further comprises one or more patterns of resource elements, wherein for a set of 12 subcarriers of a slot, one of the following sets of patterns is implemented, each pattern being defined from lower frequency to higher frequency:

for a selected slot, a pattern (i) is used in a fifth symbol and an eighth symbol of the selected slot, and a pattern (ii) is used in a nineth symbol of the selected slot, wherein the pattern (i) is a pattern of 3 empty resource elements, 2 non-empty resource elements, 3 empty resource elements, and 4 non-empty resource elements, and the pattern (ii) is a pattern of 2 empty resource elements, 3 non-empty source elements, 2 empty resource elements, 3 non-empty resource elements, and 2 empty resource elements;

for a selected slot, a pattern (iii) is used in a fifth symbol, an eighth symbol, and a twelfth symbol of the selected slot, wherein the pattern (iii) is a pattern of 6 non-empty resource elements, 2 empty resource elements, and 4 non-empty resource elements, and wherein the selected slot implements dynamic spectrum sharing;

for a selected slot, a pattern (iv) is used in a fifth symbol, wherein the pattern (iv) is a pattern of 5 non-empty resource elements, 2 empty resource elements, and 5 non-empty resource elements;

for a selected slot, a pattern (v) is used in a fifth symbol of a selected slot, a pattern (vi) is used in eighth and nineth symbols of the selected slot, and a pattern (vii) is used in eighth and nineth symbols of the selected slot, wherein the pattern (v) is a pattern of 4 empty resource elements and 8 non-empty resource elements, the pattern (vi) is a pattern of 5 non-empty symbols, 3 empty symbols, and 4 non-empty symbols, and the pattern (vii) is a pattern of 10 non-empty resource elements and 2 empty resource elements; and the empty resources elements are used for the interference measurements.

Example 3. The method according to any one of examples 1 to 2, wherein the configuration further comprises a first number of slots and a second number of slots, wherein the interference measurement is performed in the first number of slots.

Example 4. The method according to any one of examples 1 to 3, wherein the configuration further comprises at least one reference signal received power threshold.

Example 5. The method according to any one of example 4, wherein one or more of the following is performed:

in response to measurement by the user equipment of a serving cell's reference signal received power being below a first threshold, then no cell reference signal-interference mitigation is performed by the user equipment;

in response to an interfering cell's reference signal received power being above a second threshold, then the user equipment reports, via a measurement report to a base station, an indication that the interfering cell's reference signal received power is above the second threshold, for use for the base station to rate match also around this long-term evolution cell reference signal via an additional cell reference signal rate-matching pattern; or in response to an interfering cell's reference signal received power being below a third threshold, then the user equipment performs cell reference signal-interference mitigation.

Example 6. The method according to any one of examples 1 to 5, wherein configuration for the one or more interference mitigation patterns comprises indications of one or more resource elements in the time-frequency resource space to be used for cell reference signal-interference mitigation measurement.

Example 7. The method according to example 6, wherein the configuration indicates cell reference signal-interference mitigation resource information indicating the one or more interference mitigation patterns.

Example 8. The method according to example 7, wherein the channel state information-interference measurement resource information comprises indication of one or more subcarriers and corresponding one or more symbol locations within the time-frequency resource space, including indication of one or both of a repetition pattern in time within one physical resource block, or a repetition pattern in frequency within the one physical resource block.

Example 9. The method according to example 6, wherein the configuration indicates multiple cell reference signal-interference mitigation resource elements having corresponding patterns indicating individual sets of the one or more interference mitigation patterns.

Example 10. A method, comprising:

determining, by a network node, configuration for one or more interference mitigation patterns indicating which resource elements in a time-frequency resource space should be measured by a user equipment; and sending, from the network node toward the user equipment, the configuration for use by the user equipment to perform interference measurements of the one or more interference mitigation patterns.

Example 11. The method according to example 10, wherein the configuration further comprises one or more patterns of resource elements, wherein for a set of 12 subcarriers of a slot, one of the following sets of patterns is implemented, each pattern being defined from lower frequency to higher frequency:

for a selected slot, a pattern (i) is used in a fifth symbol and an eighth symbol of the selected slot, and a pattern (ii) is used in a nineth symbol of the selected slot, wherein the pattern (i) is a pattern of 3 empty resource elements, 2 non-empty resource elements, 3 empty resource elements, and 4 non-empty resource elements, and the pattern (ii) is a pattern of 2 empty resource elements, 3 non-empty source elements, 2 empty resource elements, 3 non-empty resource elements, and 2 empty resource elements;

for a selected slot, a pattern (iii) is used in a fifth symbol, an eighth symbol, and a twelfth symbol of the selected slot, wherein the pattern (iii) is a pattern of 6 non-empty resource elements, 2 empty resource elements, and 4 non-empty resource elements, and wherein the selected slot implements dynamic spectrum sharing;

for a selected slot, a pattern (iv) is used in a fifth symbol, wherein the pattern (iv) is a pattern of 5 non-empty resource elements, 2 empty resource elements, and 5 non-empty resource elements;

for a selected slot, a pattern (v) is used in a fifth symbol of a selected slot, a pattern (vi) is used in eighth and nineth symbols of the selected slot, and a pattern (vii) is used in eighth and nineth symbols of the selected slot, wherein the pattern (v) is a pattern of 4 empty resource elements and 8 non-empty resource elements, the pattern (vi) is a pattern of 5 non-empty symbols, 3 empty symbols, and 4 non-empty symbols, and the pattern (vii) is a pattern of 10 non-empty resource elements and 2 empty resource elements; and the empty resources elements are used for the interference measurements.

Example 12. The method according to any one of examples 10 to 11, wherein the configuration further comprises a first number of slots and a second number of slots, wherein the interference measurement is to be performed in the first number of slots.

Example 13. The method according to any one of examples 10 to 12, wherein the configuration further comprises at least one reference signal received power threshold.

Example 14. The method according to any one of example 13, wherein the at least one reference signal received power threshold comprises first, second, and third thresholds:

the first threshold means that, in response to measurement by the user equipment of a serving cell's reference signal received power being below the first threshold, then no cell reference signal-interference mitigation is to be performed by the user equipment;

the second threshold means that, in response to an interfering cell's reference signal received power being above the second threshold, then the user equipment is to report via a measurement report to the base station indication that the interfering cell's reference signal received power is above the second threshold; or the third threshold means that, in response to an interfering cell's reference signal received power being below a third threshold, then the user equipment is to perform cell reference signal-interference mitigation.

Example 15. The method according to example 14, further comprising rate matching, in response to indication that the interfering cell's reference signal received power is above the second threshold, by the base station around this long-term evolution cell reference signal via an additional cell reference signal rate-matching pattern.

Example 16. The method according to any one of examples 10 to 15, wherein configuration for the one or more interference mitigation patterns comprises indications of one or more resource elements in the time-frequency resource space to be used for cell reference signal-interference mitigation measurement.

Example 17. The method according to example 16, wherein the configuration indicates cell reference signal-interference mitigation resource information indicating the one or more interference mitigation patterns.

Example 18. The method according to example 17, wherein the channel state information-interference measurement resource information comprises indication of one or more subcarriers and corresponding one or more symbol locations within the time-frequency resource space, including indication of one or both of a repetition pattern in time within one physical resource block or a repetition pattern in frequency within the one physical resource block.

Example 19. The method according to example 16, wherein the configuration indicates multiple cell reference signal-interference mitigation resource elements having corresponding patterns indicating individual sets of the one or more interference mitigation patterns.

Example 20. A computer program, comprising code for performing the methods of any of examples 1 to 19, when the computer program is run on a computer.

Example 21. The computer program according to example 20, wherein the computer program is a computer program product comprising a computer-readable medium bearing computer program code embodied therein for use with the computer.

Example 22. The computer program according to example 20, wherein the computer program is directly loadable into an internal memory of the computer.

Example 23. An apparatus, comprising means for performing:

receiving, at a user equipment, configuration for one or more interference mitigation patterns indicating which resource elements in a time-frequency resource space should be measured; and performing interference measurements, by the user equipment, based on the received one or more interference mitigation patterns.

Example 24. The apparatus according to example 23, wherein the configuration further comprises one or more patterns of resource elements, wherein for a set of 12 subcarriers of a slot, one of the following sets of patterns is implemented, each pattern being defined from lower frequency to higher frequency:

for a selected slot, a pattern (i) is used in a fifth symbol and an eighth symbol of the selected slot, and a pattern (ii) is used in a ninth symbol of the selected slot, wherein the pattern (i) is a pattern of 3 empty resource elements, 2 non-empty resource elements, 3 empty resource elements, and 4 non-empty resource elements, and the pattern (ii) is a pattern of 2 empty resource elements, 3 non-empty source elements, 2 empty resource elements, 3 non-empty resource elements, and 2 empty resource elements;

for a selected slot, a pattern (iii) is used in a fifth symbol, an eighth symbol, and a twelfth symbol of the selected slot, wherein the pattern (iii) is a pattern of 6 non-empty resource elements, 2 empty resource elements, and 4 non-empty resource elements, and wherein the selected slot implements dynamic spectrum sharing;

for a selected slot, a pattern (iv) is used in a fifth symbol, wherein the pattern (iv) is a pattern of 5 non-empty resource elements, 2 empty resource elements, and 5 non-empty resource elements;

for a selected slot, a pattern (v) is used in a fifth symbol of a selected slot, a pattern (vi) is used in eighth and nineth symbols of the selected slot, and a pattern (vii) is used in eighth and nineth symbols of the selected slot, wherein the pattern (v) is a pattern of 4 empty resource elements and 8 non-empty resource elements, the pattern (vi) is a pattern of 5 non-empty symbols, 3 empty symbols, and 4 non-empty symbols, and the pattern (vii) is a pattern of 10 non-empty resource elements and 2 empty resource elements; and the empty resources elements are used for the interference measurements.

Example 25. The apparatus according to any one of examples 23 to 24, wherein the configuration further comprises a first number of slots and a second number of slots, wherein the interference measurement is performed in the first number of slots.

Example 26. The apparatus according to any one of examples 23 to 25, wherein the configuration further comprises at least one reference signal received power threshold.

Example 27. The apparatus according to any one of example 26, wherein the means are further configured to perform one or more of the following:

in response to measurement by the user equipment of a serving cell's reference signal received power being below a first threshold, then no cell reference signal-interference mitigation is performed by the user equipment;

in response to an interfering cell's reference signal received power being above a second threshold, then the user equipment reports, via a measurement report to a base station, an indication that the interfering cell's reference signal received power is above the second threshold, for use for the base station to rate match also around this long-term evolution cell reference signal via an additional cell reference signal rate-matching pattern; or in response to an interfering cell's reference signal received power being below a third threshold, then the user equipment performs cell reference signal-interference mitigation.

Example 28. The apparatus according to any one of examples 23 to 27, wherein configuration for the one or more interference mitigation patterns comprises indications of one or more resource elements in the time-frequency resource space to be used for cell reference signal-interference mitigation measurement.

Example 29. The apparatus according to example 28, wherein the configuration indicates cell reference signal-interference mitigation resource information indicating the one or more interference mitigation patterns.

Example 30. The apparatus according to example 29, wherein the channel state information-interference measurement resource information comprises indication of one or more subcarriers and corresponding one or more symbol locations within the time-frequency resource space, including indication of one or both of a repetition pattern in time within one physical resource block, or a repetition pattern in frequency within the one physical resource block.

Example 31. The apparatus according to example 28, wherein the configuration indicates multiple cell reference signal-interference mitigation resource elements having corresponding patterns indicating individual sets of the one or more interference mitigation patterns.

Example 32. An apparatus, comprising means for performing:

determining, by a network node, configuration for one or more interference mitigation patterns indicating which resource elements in a time-frequency resource space should be measured by a user equipment; and sending, from the network node toward the user equipment, the configuration for use by the user equipment to perform interference measurements of the one or more interference mitigation patterns.

Example 33. The apparatus according to example 32, wherein the configuration further comprises one or more patterns of resource elements, wherein for a set of 12 subcarriers of a slot, one of the following sets of patterns is implemented, each pattern being defined from lower frequency to higher frequency:

for a selected slot, a pattern (i) is used in a fifth symbol and an eighth symbol of the selected slot, and a pattern (ii) is used in a nineth symbol of the selected slot, wherein the pattern (i) is a pattern of 3 empty resource elements, 2 non-empty resource elements, 3 empty resource elements, and 4 non-empty resource elements, and the pattern (ii) is a pattern of 2 empty resource elements, 3 non-empty source elements, 2 empty resource elements, 3 non-empty resource elements, and 2 empty resource elements;

for a selected slot, a pattern (iii) is used in a fifth symbol, an eighth symbol, and a twelfth symbol of the selected slot, wherein the pattern (iii) is a pattern of 6 non-empty resource elements, 2 empty resource elements, and 4 non-empty resource elements, and wherein the selected slot implements dynamic spectrum sharing;

for a selected slot, a pattern (iv) is used in a fifth symbol, wherein the pattern (iv) is a pattern of 5 non-empty resource elements, 2 empty resource elements, and 5 non-empty resource elements;

for a selected slot, a pattern (v) is used in a fifth symbol of a selected slot, a pattern (vi) is used in eighth and nineth symbols of the selected slot, and a pattern (vii) is used in eighth and nineth symbols of the selected slot, wherein the pattern (v) is a pattern of 4 empty resource elements and 8 non-empty resource elements, the pattern (vi) is a pattern of 5 non-empty symbols, 3 empty symbols, and 4 non-empty symbols, and the pattern (vii) is a pattern of 10 non-empty resource elements and 2 empty resource elements; and the empty resources elements are used for the interference measurements.

Example 34. The apparatus according to any one of examples 32 to 33, wherein the configuration further comprises a first number of slots and a second number of slots, wherein the interference measurement is to be performed in the first number of slots.

Example 35. The apparatus according to any one of examples 32 to 34, wherein the configuration further comprises at least one reference signal received power threshold.

Example 36. The apparatus according to any one of example 35, wherein the at least one reference signal received power threshold comprises first, second, and third thresholds:

the first threshold means that, in response to measurement by the user equipment of a serving cell's reference signal received power being below the first threshold, then no cell reference signal-interference mitigation is to be performed by the user equipment;

the second threshold means that, in response to an interfering cell's reference signal received power being above the second threshold, then the user equipment is to report via a measurement report to the base station indication that the interfering cell's reference signal received power is above the second threshold; or the third threshold means that, in response to an interfering cell's reference signal received power being below a third threshold, then the user equipment is to perform cell reference signal-interference mitigation.

Example 37. The apparatus according to example 36, further comprising rate matching, in response to indication that the interfering cell's reference signal received power is above the second threshold, by the base station around this long-term evolution cell reference signal via an additional cell reference signal rate-matching pattern.

Example 38. The apparatus according to any one of examples 32 to 37, wherein configuration for the one or more interference mitigation patterns comprises indications of one or more resource elements in the time-frequency resource space to be used for cell reference signal-interference mitigation measurement.

Example 39. The apparatus according to example 38, wherein the configuration indicates cell reference signal-interference mitigation resource information indicating the one or more interference mitigation patterns.

Example 40. The apparatus according to example 39, wherein the channel state information-interference measurement resource information comprises indication of one or more subcarriers and corresponding one or more symbol locations within the time-frequency resource space, including indication of one or both of a repetition pattern in time within one physical resource block or a repetition pattern in frequency within the one physical resource block.

Example 41. The apparatus according to example 38, wherein the configuration indicates multiple cell reference signal-interference mitigation resource elements having corresponding patterns indicating individual sets of the one or more interference mitigation patterns.

Example 42. The apparatus of any preceding apparatus example, wherein the means comprises:

at least one processor; and at least one memory including computer program code, the at least one memory and computer program code configured to, with the at least one processor, cause the performance of the apparatus.

Example 43. An apparatus, comprising:

one or more processors; and one or more memories including computer program code, wherein the one or more memories and the computer program code are configured, with the one or more processors, to cause the apparatus to:

receive, at a user equipment, configuration for one or more interference mitigation patterns indicating which resource elements in a time-frequency resource space should be measured; and perform interference measurements, by the user equipment, based on the received one or more interference mitigation patterns.

Example 44. The apparatus according to example 43, wherein the configuration further comprises one or more patterns of resource elements, wherein for a set of 12 subcarriers of a slot, one of the following sets of patterns is implemented, each pattern being defined from lower frequency to higher frequency:

for a selected slot, a pattern (i) is used in a fifth symbol and an eighth symbol of the selected slot, and a pattern (ii) is used in a nineth symbol of the selected slot, wherein the pattern (i) is a pattern of 3 empty resource elements, 2 non-empty resource elements, 3 empty resource elements, and 4 non-empty resource elements, and the pattern (ii) is a pattern of 2 empty resource elements, 3 non-empty source elements, 2 empty resource elements, 3 non-empty resource elements, and 2 empty resource elements;

for a selected slot, a pattern (iii) is used in a fifth symbol, an eighth symbol, and a twelfth symbol of the selected slot, wherein the pattern (iii) is a pattern of 6 non-empty resource elements, 2 empty resource elements, and 4 non-empty resource elements, and wherein the selected slot implements dynamic spectrum sharing;

for a selected slot, a pattern (iv) is used in a fifth symbol, wherein the pattern (iv) is a pattern of 5 non-empty resource elements, 2 empty resource elements, and 5 non-empty resource elements;

for a selected slot, a pattern (v) is used in a fifth symbol of a selected slot, a pattern (vi) is used in eighth and nineth symbols of the selected slot, and a pattern (vii) is used in eighth and nineth symbols of the selected slot, wherein the pattern (v) is a pattern of 4 empty resource elements and 8 non-empty resource elements, the pattern (vi) is a pattern of 5 non-empty symbols, 3 empty symbols, and 4 non-empty symbols, and the pattern (vii) is a pattern of 10 non-empty resource elements and 2 empty resource elements; and the empty resources elements are used for the interference measurements.

Example 45. The apparatus according to any one of examples 43 to 44, wherein the configuration further comprises a first number of slots and a second number of slots, wherein the interference measurement is performed in the first number of slots.

Example 46. The apparatus according to any one of examples 43 to 45, wherein the configuration further comprises at least one reference signal received power threshold.

Example 47. The apparatus according to any one of example 46, wherein one or more of the following is performed:

in response to measurement by the user equipment of a serving cell's reference signal received power being below a first threshold, then no cell reference signal-interference mitigation is performed by the user equipment;

in response to an interfering cell's reference signal received power being above a second threshold, then the user equipment reports, via a measurement report to a base station, an indication that the interfering cell's reference signal received power is above the second threshold, for use for the base station to rate match also around this long-term evolution cell reference signal via an additional cell reference signal rate-matching pattern; or in response to an interfering cell's reference signal received power being below a third threshold, then the user equipment performs cell reference signal-interference mitigation.

Example 48. The apparatus according to any one of examples 43 to 47, wherein configuration for the one or more interference mitigation patterns comprises indications of one or more resource elements in the time-frequency resource space to be used for cell reference signal-interference mitigation measurement.

Example 49. The apparatus according to example 48, wherein the configuration indicates cell reference signal-interference mitigation resource information indicating the one or more interference mitigation patterns.

Example 50. The apparatus according to example 49, wherein the channel state information-interference measurement resource information comprises indication of one or more subcarriers and corresponding one or more symbol locations within the time-frequency resource space, including indication of one or both of a repetition pattern in time within one physical resource block, or a repetition pattern in frequency within the one physical resource block.

Example 51. The apparatus according to example 48, wherein the configuration indicates multiple cell reference signal- interference mitigation resource elements having corresponding patterns indicating individual sets of the one or more interference mitigation patterns.

Example 52. An apparatus, comprising:
one or more processors; and
one or more memories including computer program code,
wherein the one or more memories and the computer program code are configured, with the one or more processors, to cause the apparatus to:
determine, by a network node, configuration for one or more interference mitigation patterns indicating which resource elements in a time-frequency resource space should be measured by a user equipment; and
send, from the network node toward the user equipment, the configuration for use by the user equipment to perform interference measurements of the one or more interference mitigation patterns.

Example 53. The apparatus according to example 52, wherein the configuration further comprises one or more patterns of resource elements, wherein for a set of 12 subcarriers of a slot, one of the following sets of patterns is implemented, each pattern being defined from lower frequency to higher frequency:

for a selected slot, a pattern (i) is used in a fifth symbol and an eighth symbol of the selected slot, and a pattern (ii) is used in a nineth symbol of the selected slot, wherein the pattern (i) is a pattern of 3 empty resource elements, 2 non-empty resource elements, 3 empty resource elements, and 4 non-empty resource elements, and the pattern (ii) is a pattern of 2 empty resource elements, 3 non-empty source elements, 2 empty resource elements, 3 non-empty resource elements, and 2 empty resource elements;

for a selected slot, a pattern (iii) is used in a fifth symbol, an eighth symbol, and a twelfth symbol of the selected slot, wherein the pattern (iii) is a pattern of 6 non-empty resource elements, 2 empty resource elements, and 4 non-empty resource elements, and wherein the selected slot implements dynamic spectrum sharing;

for a selected slot, a pattern (iv) is used in a fifth symbol, wherein the pattern (iv) is a pattern of 5 non-empty resource elements, 2 empty resource elements, and 5 non-empty resource elements;

for a selected slot, a pattern (v) is used in a fifth symbol of a selected slot, a pattern (vi) is used in eighth and nineth symbols of the selected slot, and a pattern (vii) is used in eighth and nineth symbols of the selected slot, wherein the pattern (v) is a pattern of 4 empty resource elements and 8 non-empty resource elements, the pattern (vi) is a pattern of 5 non-empty symbols, 3 empty symbols, and 4 non-empty symbols, and the pattern (vii) is a pattern of 10 non-empty resource elements and 2 empty resource elements; and the empty resources elements are used for the interference measurements.

Example 54. The apparatus according to any one of examples 52 to 53, wherein the configuration further comprises a first number of slots and a second number of slots, wherein the interference measurement is to be performed in the first number of slots.

Example 55. The apparatus according to any one of examples 52 to 54, wherein the configuration further comprises at least one reference signal received power threshold.

Example 56. The apparatus according to any one of example 55, wherein the at least one reference signal received power threshold comprises first, second, and third thresholds:

the first threshold means that, in response to measurement by the user equipment of a serving cell's reference signal received power being below the first threshold, then no cell reference signal-interference mitigation is to be performed by the user equipment;

the second threshold means that, in response to an interfering cell's reference signal received power being above the second threshold, then the user equipment is to report via a measurement report to the base station indication that the interfering cell's reference signal received power is above the second threshold; or the third threshold means that, in response to an interfering cell's reference signal received power being below a third threshold, then the user equipment is to perform cell reference signal-interference mitigation.

Example 57. The apparatus according to example 56, further comprising rate matching, in response to indication that the interfering cell's reference signal received power is above the second threshold, by the base station around this long-term evolution cell reference signal via an additional cell reference signal rate-matching pattern.

Example 58. The apparatus according to any one of examples 52 to 57, wherein configuration for the one or more interference mitigation patterns comprises indications of one or more resource elements in the time-frequency resource space to be used for cell reference signal-interference mitigation measurement.

Example 59. The apparatus according to example 58, wherein the configuration indicates cell reference signal-interference mitigation resource information indicating the one or more interference mitigation patterns.

Example 60. The apparatus according to example 59, wherein the channel state information-interference measurement resource information comprises indication of one or more subcarriers and corresponding one or more symbol locations within the time-frequency resource space, including indication of one or both of a repetition pattern in time within one physical resource block or a repetition pattern in frequency within the one physical resource block.

Example 61. The apparatus according to example 58, wherein the configuration indicates multiple cell reference signal-interference mitigation resource elements having corresponding patterns indicating individual sets of the one or more interference mitigation patterns.

As used in this application, the term "circuitry" may refer to one or more or all of the following:

(a) hardware-only circuit implementations (such as implementations in only analog and/or digital circuitry) and (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Embodiments herein may be implemented in software (executed by one or more processors), hardware (e.g., an application specific integrated circuit), or a combination of software and hardware. In an example embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 1. A computer-readable medium may comprise a computer-readable storage medium (e.g., memories 125, 155, 171 or other device) that may be any media or means that can contain, store, and/or transport the instructions for use by or in connection with an instruction execution system, apparatus, or device, such as a computer. A computer-readable storage medium does not comprise propagating signals.

If desired, the different functions discussed herein may be performed in a different order and/or concurrently with each other. Furthermore, if desired, one or more of the above-described functions may be optional or may be combined.

Although various aspects are set out above, other aspects comprise other combinations of features from the described embodiments, and not solely the combinations described above.

It is also noted herein that while the above describes example embodiments of the invention, these descriptions should not be viewed in a limiting sense. Rather, there are several variations and modifications which may be made without departing from the scope of the present invention.

The following abbreviations that may be found in the specification and/or the drawing figures are defined as follows:

3GPP third generation partnership project
5G fifth generation
5GC 5G core network
AMF access and mobility management function
BS base station
BWP bandwidth part
CE control element
CRS cell reference signal
CRS-IM CRS Interference Mitigation
CRS-RM CRS Rate Matching
CSI-IM channel state information interference measurement
CSI-RS channel state information-reference signal
CU central unit
DC direct current DCI downlink control information
DL downlink (from the network toward the UE)
DSS dynamic spectrum sharing
DU distributed unit
eNB (or eNodeB) evolved Node B (e.g., an LTE base station)
EN-DC E-UTRA-NR dual connectivity
en-gNB or En-gNB node providing NR user plane and control plane protocol terminations towards the UE, and acting as secondary node in EN-DC
E-UTRA evolved universal terrestrial radio access, i.e., the LTE radio access technology
FDD frequency division duplex
FFS for future study
FR frequency range
gNB (or gNodeB) base station for 5G/NR, i.e., a node providing NR user plane and control plane protocol terminations towards the UE, and connected via the NG interface to the 5GC
IE information element
I/F interface
IM Interference Mitigation
LLR log-likelihood ratio
LTE long term evolution
LUT look up table
MAC medium access control
MB SFN Multimedia Broadcast Single Frequency Network
MME mobility management entity
MO measurement object
ng or NG next generation
ng-eNB or NG-eNB next generation eNB
NR new radio
N/W or NW network
NWA network assistance
NZP non-zero power
OFDM orthogonal frequency division multiplexing
PCI physical cell identifier
PBCH Physical broadcast channel
PDCCH physical downlink control channel
PDCP packet data convergence protocol
PDSCH physical downlink shared channel
PHY physical layer
PRB physical resource block
Qos quality of service
RAN radio access network
RAT radio access technology
RE resource element
RedCap reduced capacity
Rel release
RLC radio link control
RM rate match
RRH remote radio head
RRC radio resource control
RU radio unit
Rx receiver
SC subcarrier
SDAP service data adaptation protocol
SGW serving gateway
SMF session management function
SSB synchronization signal block
TS technical specification
Tx transmitter
UE user equipment (e.g., a wireless, typically mobile device)
UL uplink (from the UE to the network)
UPF user plane function
WF way forward
ZP zero power

What is claimed is:

1. A method, comprising:
receiving, at a user equipment, configuration for one or more interference mitigation patterns indicating which resource elements in a time-frequency resource space should be measured, wherein the configuration further comprises at least one reference signal received power threshold; and
performing interference measurements, by the user equipment using the configuration, based on the one or more interference mitigation patterns,
wherein one or more of the following is performed:
in response to measurement by the user equipment of a serving cell's reference signal received power being below a first threshold, then no cell reference signal-interference mitigation is performed by the user equipment;
in response to an interfering cell's reference signal received power being above a second threshold, then the user equipment reports, via a measurement report to a base station, an indication that the interfering cell's reference signal received power is above the second threshold, for use for the base station to rate match around this long-term evolution cell reference signal via an additional cell reference signal rate-matching pattern; or
in response to an interfering cell's reference signal received power being below a third threshold, then the user equipment performs cell reference signal-interference mitigation.

2. An apparatus, comprising:
one or more processors; and
one or more memories storing instructions that, when executed by the one or more processors, cause the apparatus to perform at least the following:
receiving, at a user equipment, configuration for one or more interference mitigation patterns indicating which resource elements in a time-frequency resource space should be measured, wherein the configuration further comprises at least one reference signal received power threshold; and
performing interference measurements, by the user equipment using the configuration, based on the one or more interference mitigation patterns,
wherein one or more of the following is performed:
in response to measurement by the user equipment of a serving cell's reference signal received power being below a first threshold, then no cell reference signal-interference mitigation is performed by the user equipment;
in response to an interfering cell's reference signal received power being above a second threshold, then the user equipment reports, via a measurement report to a base station, an indication that the interfering cell's reference signal received power is above the second threshold, for use for the base station to rate match around this long-term evolution cell reference signal via an additional cell reference signal rate-matching pattern; or
in response to an interfering cell's reference signal received power being below a third threshold, then the user equipment performs cell reference signal-interference mitigation.

3. The apparatus according to claim 2, wherein the configuration further comprises one or more patterns of resource elements, wherein for a set of 12 subcarriers of a slot, one of the following sets of patterns is implemented, each pattern being defined from lower frequency to higher frequency:

for a selected slot, a pattern (i) is used in a fifth symbol and an eighth symbol of the selected slot, and a pattern (ii) is used in a nineth symbol of the selected slot, wherein the pattern (i) is a pattern of 3 empty resource elements, 2 non-empty resource elements, 3 empty resource elements, and 4 non-empty resource elements, and the pattern (ii) is a pattern of 2 empty resource elements, 3 non-empty source elements, 2 empty resource elements, 3 non-empty resource elements, and 2 empty resource elements;

for a selected slot, a pattern (iii) is used in a fifth symbol, an eighth symbol, and a twelfth symbol of the selected slot, wherein the pattern (iii) is a pattern of 6 non-empty resource elements, 2 empty resource elements, and 4 non-empty resource elements, and wherein the selected slot implements dynamic spectrum sharing;

for a selected slot, a pattern (iv) is used in a fifth symbol, wherein the pattern (iv) is a pattern of 5 non-empty resource elements, 2 empty resource elements, and 5 non-empty resource elements;

for a selected slot, a pattern (v) is used in a fifth symbol of a selected slot, a pattern (vi) is used in eighth and nineth symbols of the selected slot, and a pattern (vii) is used in eighth and nineth symbols of the selected slot, wherein the pattern (v) is a pattern of 4 empty resource elements and 8 non-empty resource elements, the pattern (vi) is a pattern of 5 non-empty symbols, 3 empty symbols, and 4 non-empty symbols, and the pattern (vii) is a pattern of 10 non-empty resource elements and 2 empty resource elements; and the empty resources elements are used for the interference measurements.

4. The apparatus according to claim 2, wherein the configuration further comprises a first number of slots and a second number of slots, wherein the interference measurements are performed in the first number of slots.

5. The apparatus according to claim 2, wherein the configuration for the one or more interference mitigation patterns comprises indications of one or more resource elements in the time-frequency resource space to be used for cell reference signal-interference mitigation measurement.

6. The apparatus according to claim 5, wherein the configuration indicates cell reference signal-interference mitigation resource information indicating the one or more interference mitigation patterns.

7. The apparatus according to claim 6, wherein the cell reference signal-interference mitigation resource information comprises indication of one or more subcarriers and corresponding one or more symbol locations within the time-frequency resource space, including indication of one or both of a repetition pattern in time within one physical resource block, or a repetition pattern in frequency within the one physical resource block.

8. The apparatus according to claim 5, wherein the configuration indicates multiple cell reference signal-interference mitigation resource elements having corresponding patterns indicating individual sets of the one or more interference mitigation patterns.

9. An apparatus, comprising:
one or more processors; and
one or more memories storing instructions that, when executed by the one or more processors, cause the apparatus to perform at least the following:

determining, by a network node, configuration for one or more interference mitigation patterns indicating which resource elements in a time-frequency resource space should be measured by a user equipment, wherein the configuration further comprises at least one reference signal received power threshold; and sending, from the network node toward the user equipment, the configuration for use by the user equipment to perform interference measurements of the one or more interference mitigation patterns, wherein the at least one reference signal received power threshold comprises first, second, and third thresholds:

the first threshold means that, in response to measurement by the user equipment of a serving cell's reference signal received power being below the first threshold, then no cell reference signal-interference mitigation is to be performed by the user equipment;

the second threshold means that, in response to an interfering cell's reference signal received power being above the second threshold, then the user equipment is to report via a measurement report to the base station indication that the interfering cell's reference signal received power is above the second threshold; and the third threshold means that, in response to an interfering cell's reference signal received power being below a third threshold, then the user equipment is to perform cell reference signal-interference mitigation.

10. The apparatus according to claim 9, wherein the configuration further comprises one or more patterns of resource elements, wherein for a set of 12 subcarriers of a slot, one of the following sets of patterns is implemented, each pattern being defined from lower frequency to higher frequency:

for a selected slot, a pattern (i) is used in a fifth symbol and an eighth symbol of the selected slot, and a pattern (ii) is used in a nineth symbol of the selected slot, wherein the pattern (i) is a pattern of 3 empty resource elements, 2 non-empty resource elements, 3 empty resource elements, and 4 non-empty resource elements, and the pattern (ii) is a pattern of 2 empty resource elements, 3 non-empty source elements, 2 empty resource elements, 3 non-empty resource elements, and 2 empty resource elements;

for a selected slot, a pattern (iii) is used in a fifth symbol, an eighth symbol, and a twelfth symbol of the selected slot, wherein the pattern (iii) is a pattern of 6 non-empty resource elements, 2 empty resource elements, and 4 non-empty resource elements, and wherein the selected slot implements dynamic spectrum sharing;

for a selected slot, a pattern (iv) is used in a fifth symbol, wherein the pattern (iv) is a pattern of 5 non-empty resource elements, 2 empty resource elements, and 5 non-empty resource elements;

for a selected slot, a pattern (v) is used in a fifth symbol of a selected slot, a pattern (vi) is used in eighth and nineth symbols of the selected slot, and a pattern (vii) is used in eighth and nineth symbols of the selected slot, wherein the pattern (v) is a pattern of 4 empty resource elements and 8 non-empty resource elements, the pattern (vi) is a pattern of 5 non-empty symbols, 3 empty symbols, and 4 non-empty symbols, and the pattern (vii) is a pattern of 10 non-empty resource elements and 2 empty resource elements; and the empty resources elements are used for the interference measurements.

11. The method according to claim 10, wherein the configuration for the one or more interference mitigation patterns comprises indications of one or more resource elements in the time-frequency resource space to be used for cell reference signal-interference mitigation measurement.

12. The method according to claim 11, wherein the configuration indicates cell reference signal-interference mitigation resource information indicating the one or more interference mitigation patterns.

13. The apparatus according to claim 12, wherein the cell reference signal-interference mitigation resource information comprises indication of one or more subcarriers and corresponding one or more symbol locations within the time-frequency resource space, including indication of one or both of a repetition pattern in time within one physical resource block, or a repetition pattern in frequency within the one physical resource block.

14. The apparatus according to claim 10, wherein the configuration indicates multiple cell reference signal-interference mitigation resource elements having corresponding patterns indicating individual sets of the one or more interference mitigation patterns.

15. The apparatus according to claim 9, wherein the configuration further comprises a first number of slots and a second number of slots, wherein the interference measurements are to be performed in the first number of slots.

16. The apparatus according to claim 9, further comprising rate matching, in response to indication that the interfering cell's reference signal received power is above the second threshold, by the base station around cell reference signal via an additional cell reference signal rate-matching pattern.

17. The apparatus according to claim 9, wherein configuration for the one or more interference mitigation patterns comprises indications of one or more resource elements in the time-frequency resource space to be used for cell reference signal-interference mitigation measurement.

18. The apparatus according to claim 17, wherein the configuration indicates cell reference signal-interference mitigation resource information indicating the one or more interference mitigation patterns.

19. The apparatus according to claim 18, wherein the channel state information-interference measurement resource information comprises indication of one or more subcarriers and corresponding one or more symbol locations within the time-frequency resource space, including indication of one or both of a repetition pattern in time within one physical resource block or a repetition pattern in frequency within the one physical resource block.

20. The apparatus according to claim 17, wherein the configuration indicates multiple cell reference signal-interference mitigation resource elements having corresponding patterns indicating individual sets of the one or more interference mitigation patterns.

* * * * *